United States Patent
Victor et al.

(10) Patent No.: US 9,345,978 B1
(45) Date of Patent: May 24, 2016

(54) ACTION TOYS EMPLOYING ACTUATORS AND INCLUDING CONTROL ELEMENTS

(71) Applicant: Hasbro, Inc., Pawtucket, RI (US)

(72) Inventors: Robert James Victor, Sunnyside, NY (US); James August Baker, Long Island City, NY (US); Matthew Devin Brown, Warwick, RI (US); James Austin Rucker, Pawtucket, RI (US); William J Bryant, Dayton, OH (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 14/549,918

(22) Filed: Nov. 21, 2014

Related U.S. Application Data

(60) Provisional application No. 61/908,425, filed on Nov. 25, 2013.

(51) Int. Cl.
| | |
|---|---|
| *A63H 3/20* | (2006.01) |
| *A63H 13/02* | (2006.01) |
| *A63H 3/14* | (2006.01) |
| *A63H 3/46* | (2006.01) |
| *A63H 3/48* | (2006.01) |
| *A63H 3/50* | (2006.01) |
| *A63H 31/00* | (2006.01) |

(52) U.S. Cl.
CPC .............. *A63H 13/02* (2013.01); *A63H 3/14* (2013.01); *A63H 3/20* (2013.01); *A63H 3/46* (2013.01); *A63H 3/48* (2013.01); *A63H 3/50* (2013.01); *A63H 31/00* (2013.01)

(58) Field of Classification Search
USPC .......... 446/330, 331, 334, 335, 336, 359, 376
See application file for complete search history.

(56) References Cited

U.S. PATENT DOCUMENTS

| | | | | |
|---|---|---|---|---|
| 2,088,510 A | * | 7/1937 | Frasca ..................... | A63H 13/06 446/334 |
| 3,147,566 A | * | 9/1964 | Ong ......................... | A63H 3/18 446/359 |
| 3,235,259 A | | 2/1966 | Glass et al. | |
| 3,864,870 A | | 2/1975 | Breslow et al. | |
| 3,874,112 A | | 4/1975 | Sapkus et al. | |
| 3,928,934 A | * | 12/1975 | Lewis ...................... | A63H 3/48 446/359 |
| 4,476,650 A | | 10/1984 | Lokvig | |
| 4,560,362 A | * | 12/1985 | Renger .................... | A63H 3/20 446/340 |
| 4,565,537 A | | 1/1986 | Klimpert et al. | |
| 4,601,672 A | * | 7/1986 | Cook ........................ | A63H 3/20 446/330 |
| 4,605,382 A | * | 8/1986 | Cook ........................ | A63H 3/20 446/330 |
| 4,623,318 A | * | 11/1986 | Tsiknopoulos .......... | A63H 3/48 446/219 |
| 4,673,367 A | | 6/1987 | MacBain | |
| 4,714,446 A | | 12/1987 | Lee | |
| 4,968,280 A | * | 11/1990 | Kelley ..................... | A63H 3/20 446/330 |

(Continued)

*Primary Examiner* — Kurt Fernstrom
(74) *Attorney, Agent, or Firm* — Perry Hoffman

(57) ABSTRACT

A toy figure assembly including a footing assembly in combination with a dual action actuator employing first and second working surfaces accessible through underside openings of the footing assembly for driving action movements of the toy figure by both a user's fingers and a piston driven controller secured to the footing. Further alternative embodiments with various alternative mechanism appendage couplings with the torso assembly through the footing gears, bracket or channel elements facilitate driven for movements in relation to the torso assembly moved relative to the footing assembly. Battling action game play may be expanded with the controller to battle virtual robots, allowing users to play various interactive computer based games.

20 Claims, 27 Drawing Sheets

(56) References Cited

U.S. PATENT DOCUMENTS

| | | | | |
|---|---|---|---|---|
| 4,995,846 A | * | 2/1991 | Mariol | A63H 3/46 446/376 |
| 5,334,073 A | | 8/1994 | Tilbor et al. | |
| 5,458,523 A | | 10/1995 | Aoki et al. | |
| 5,672,108 A | | 9/1997 | Lam et al. | |
| 5,906,369 A | | 5/1999 | Brennan et al. | |
| 6,022,263 A | * | 2/2000 | Liu | A63H 3/20 446/330 |
| 6,280,286 B1 | | 8/2001 | Andrews | |
| 6,579,143 B1 | | 6/2003 | Rehkemper et al. | |
| 7,291,052 B2 | * | 11/2007 | Ellman | A63H 3/16 446/100 |
| 7,338,341 B2 | | 3/2008 | Hoeting et al. | |
| 7,475,881 B2 | | 1/2009 | Blagg et al. | |
| 7,575,496 B2 | | 8/2009 | Lau et al. | |
| 7,611,397 B1 | * | 11/2009 | Lund | A63H 3/00 446/199 |
| 8,137,151 B2 | | 3/2012 | Kenney | |
| 2006/0292965 A1 | | 12/2006 | Strauss | |
| 2007/0015433 A1 | * | 1/2007 | Howard | A63H 3/365 446/321 |

* cited by examiner

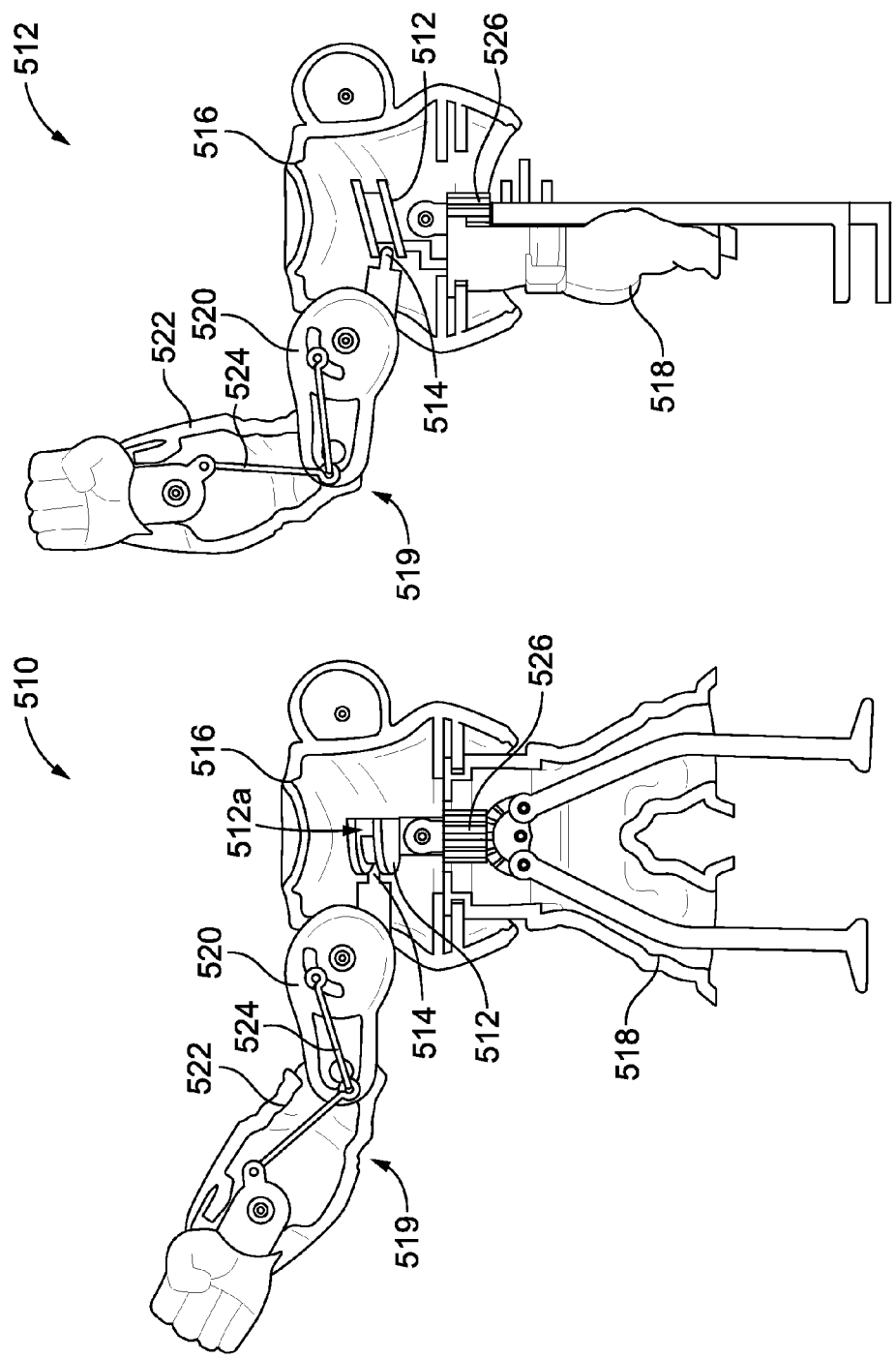

US 9,345,978 B1

ACTION TOYS EMPLOYING ACTUATORS AND INCLUDING CONTROL ELEMENTS

PRIORITY CROSS-REFERENCE TO RELATED APPLICATION

This application claims priority pursuant to 35 U.S.C. 119 (e) or 120 from U.S. Provisional Applications No. 61/908, 425, filed, Nov. 25, 2013.

FIELD OF THE INVENTION

The present invention relates to movable toy figures and more particularly to a toy figure having a footing assembly in combination with a dual action actuator employing a working surface accessible through one or more actuator access openings of the footing assembly for driving an action movement of the toy figure by both a user's fingers and a variety of controllers secured to the footing, with various alternative control elements and appendage couplings.

BACKGROUND OF THE INVENTION

There are several known toy action figures which employ a pistol type grip or hand held base for driving movement of the toy figure. Additionally, several known toy action figures employ punching mechanisms for extending arm appendages in a punching action or attacking movement through a manual actuator and/or game base linked to the action figures. None of the known action figures however, employ a dual action actuator with a working surface accessible through one or more actuator access openings for manual and controller activation of the same action movements.

An animating device for toy figures for selectively swinging a toy figure's leg or arm through simulated activities upon actuation of a trigger on a pistol type hand grip, is exemplified and disclosed in U.S. Pat. No. 3,874,112, issued Apr. 1, 1975 to Sapkus et al. for "Animating Device for Figure Toys". Sapkus has a pistol-type hand grip in which the trigger swings a primary lever which moves a push rod into engagement with a secondary lever. The push rod and secondary lever are carried by a slotted sleeve rotatably mounted in the hollow barrel portion of the hand grip. The sleeve rotates through first, second, and third positions to adjust the secondary lever to swing a leg, release a latch to simulate a batters swing and position the lever to engage an arm mechanism, respectively. Additionally, a multiple limb puppet actuated by multiple triggers is exemplified and disclosed in U.S. Pat. No. 4,476, 650, issued Oct. 16, 1984 to Lokvig for "Trigger Actuated Puppet". Lokvig discloses puppet limbs pivotably connected to a puppet body and activated by strings connected at one end to the limbs and the other end to trigger assemblies in the pistol grip. The trigger assemblies can selectively activate specific limbs of the puppet without entanglement of the strings.

An action figure providing a kicking action actuated by a hand-held base is disclosed and exemplified in U.S. Pat. No. 5,458,523, issued Oct. 17, 1995 to Aoki et al. for "Action Character Figure Assembly" and assigned to Hasbro, Inc. Aoki discloses a character figure releasably mounted on a first leg on an elongated base employing a control mechanism for rapidly rotating the figure about the axis of the first leg to cause the figure to perform a kicking action with a second leg.

A combat toy figure pair is disclosed and exemplified in U.S. Pat. No. 6,280,286, issued Aug. 28, 2001 to Andrews, for "Toy Figure Pair Simulating Combat". Andrews discloses a first figure including a rotatably supported toggle in communication with a pair of arms to simulate a punching action. A second figure includes a wheel plate and plurality of wheels. The first figure punches the second figure through manipulation of the toggle and the second figure responds by rolling away when struck. Another known toy action figure configured to manually move between various positions is disclosed and exemplified in US Patent Application US 2006/0292965 A1, published Dec. 28, 2006 to Strauss for "Toy Figures". Strauss discloses a toy figure with a first limb extending from a body including a first upper member and first lower member operatively connected through a first gear assembly to move the first upper and lower members between a retracted and extended positions. A manual actuator connected to the body translates linear movement of the manual actuator to rotary movement of the gear of the first gear assembly.

An action toy mounted on a platform and employing a punching mechanism for extending arm appendages in a punching action is disclosed and exemplified in U.S. Pat. No. 8,137,151, issued Mar. 20, 2012 to Kenny for "Action Toy". A number of gear mechanisms and/or rods extending through the toy figure to buttons and/or switches in a controller(s) cooperate to move the limbs of the toy figure. Additionally, movement of the toy figure relative to a platform upon which it is mounted utilizes a base member coupled to a base portion upon which the toy figure is mounted. The controller moves the base member with the help of a first and second ball joint linked to the base member, which in turn moves the base portion and mounted toy figure along the platform.

Similarly, a fighting figure game employing a gear driven punching mechanism and toy figures mounted on a platform is disclosed and exemplified in U.S. Pat. No. 7,475,881, issued Jan. 13, 2009 to Blagg et al. for "Fighting Figure Game. Control assemblies coupled to a platform and associated figures are manipulated to fight with each other and with head elements of each figure configured to move between first and second positions upon impact to the figure.

Significantly, known action toy figures do not include a footing assembly in combination with a dual action actuator employing a working surface accessible through one or more actuator access openings of the footing assembly for driving an action movement of the toy figure by both a user's fingers and a variety of controllers secured to the footing. Further, known action toy figures do not include a dual action actuator having two working surfaces accessible through two different openings in a figure's footing assembly. It would be desirable to provide a footing assembly with an elevational opening and an underside opening and a dual action actuator within the footing assembly and engaging the torso assembly through a linkage and gear mechanism for driving movement of the torso assembly with respect to the footing assembly.

SUMMARY OF THE INVENTION

The present invention addresses shortcomings of the prior art to provide a toy action figure employing an actuator that is activated by both a user's fingers and a variety of controllers secured to the figure. The dual action actuator is disposed within a footing assembly of the toy figure and in mechanical communication with a torso assembly through a linkage and gear assembly for driving movement of the torso assembly with respect to the footing assembly. The novel toy figure assemblies of the described embodiments further facilitate the footing assembly in combination with the dual action actuator employing a working surface accessible through one or more actuator access openings for driving action movements of the toy figure by both a user's fingers and a variety of controllers secured to the footing. Further first and second working surfaces accessible through elevational and underside openings of the footing assembly drive action movements of the toy figure by both a user's fingers and a piston driven controller secured to the footing. Additionally, further inventive embodiments with various alternative mechanism appendage couplings with the torso assembly through the footing gears, bracket or channel elements facilitate driving movements in relation to the torso assembly moved relative to the footing assembly. Battling action game play may be expanded with the controller to battle virtual robots, allowing users to play various interactive computer based games.

In one embodiment of the invention, a toy figure includes a footing assembly having an actuator access opening, a torso assembly in mechanical communication with the footing assembly allowing movement of the torso assembly in relation to the footing assembly, an arcuate rack gear having at least a semi-circular periphery comprising gear teeth arranged from a first end to a second end of the semi-circular periphery of the arcuate rack gear, a linkage extending between the torso assembly at the first end of the semi-circular periphery of the arcuate rack gear and a distal end of the linkage extending into the footing assembly, and a torso pinion gear within the torso assembly in mechanical communication with the arcuate rack gear for driving the movement of the torso assembly in relation to the footing assembly. Further included is an actuator within the footing assembly coupled through the distal end of the linkage, the actuator having a working surface accessible through the actuator access opening for actuating the gear assembly and driving movement of the torso assembly in relation to the footing assembly.

In another embodiment of the invention, a second linkage is further included and extending from the second end of the semi-circular periphery of the arcuate rack with a distal end of the second linkage extending into the footing assembly, and a second actuator is further included and coupled to the arcuate rack through a distal end of the second linkage, the second actuator positioned within the footing assembly and further including a working surface accessible from the actuator access opening, the second actuator cooperating with the first actuator to activate the arcuate rack and pinion gears driving movement of the torso assembly in relation to the footing assembly.

In another embodiment of the invention, a controller having a platform assembly for receiving the footing assembly is further included and also a binding assembly coupling the footing assembly to the platform assembly and a manual control element disposed adjacent the platform assembly, the manual control element includes a first end disposed adjacent the platform and a second free end defining an actuating point extending into contact with the working surface of the actuator at the actuator access opening of the received footing assembly, the actuating point activates the toy figure through its footing assembly driving movement of the torso assembly in relation to the footing assembly. In another embodiment of the invention, a piston driven controller having a platform assembly for receiving the footing assembly and a manual control element are further included, the platform assembly includes a through hole and the manual control element includes a piston at the through hole for piston movement between an extending position and a retracting position within the footing assembly for driving the actuator at the working surface when the piston is extending for driving movement of the torso assembly in relation to the footing assembly.

In another embodiment of the invention, the actuator access opening of the footing assembly further comprises an elevational outer opening and the working surface is accessible from the elevational outer opening, with the manual control element driving the actuator at the elevational opening of the footing assembly. In yet another embodiment, a second working surface at the actuator is included and the actuator access opening further includes an underside opening with the second working surface accessible from the underside opening and the piston driving the actuator at the second working surface through the underside opening of the footing assembly.

In another embodiment of the invention, an arm appendage is further included and a pinion gear mechanism in the torso assembly is also included and in mechanical engagement with the arm appendage. A footing pinion gear is further included and linked with the footing assembly and positioned within the torso assembly having gear teeth that mesh with the pinion gear mechanism for driving movement of the arm appendage when the torso assembly moves in relation to the footing assembly.

In another embodiment of the invention, an arm appendage is further included and a shoulder pin in the torso assembly is also included for coupling the arm appendage to freely move about the shoulder pin swinging the arm appendage out away from the torso assembly when the torso assembly moves in relation to the footing assembly. In another embodiment, a rack gear is further included and positioned within the torso assembly having an abutment surface for engaging the arm appendage and driving the arm appendage to swing to an elevated position from the torso assembly when the torso assembly is moved in relation to the footing assembly, and in another embodiment, the rack gear includes a row of gear teeth, and a footing pinion gear is further included and linked with the footing assembly and positioned within the torso assembly having gear teeth that mesh with the gear teeth of the rack for driving the rack gear back and forth laterally across the torso contacting the arm appendage with the abutment surface of the rack.

In yet another embodiment of the invention, a piston driven controller having a platform for receiving the footing assembly is further included. The platform includes a through hole and a piston at the through hole for piston movement between an extending position and a retracting position, and the piston within the footing assembly drives the actuator at the second working surface when the piston is in the extending position driving movement of the torso assembly in relation to the footing assembly.

In another embodiment of the invention, the piston driven controller further includes a plurality of switches at the platform and a sound generating device coupled to the switches for producing a respective sound corresponding to the respective footing assembly received at the platform. In another embodiment, the footing assembly further includes a plate for clipping onto the controller platform and selectively located through holes in the plate.

In another embodiment of the invention, a toy figure includes a footing assembly having an elevational outer opening, and an underside opening, a first axle, an arcuate rack gear mounted on the first axle and having at least a semi-circular periphery comprising gear teeth arranged from a first end to a second end of the semi-circular periphery of the arcuate rack gear, a second axle disposed generally perpendicular to the first axle, a torso pinion gear within the torso assembly mounted on the second axle and in mechanical communication with the arcuate rack gear, and a linkage coupled to a first end of the semi-circular periphery of the arcuate rack and a distal end of the linkage extending into the footing assembly. An actuator within the footing assembly and coupled to the distal end of the linkage is further included.

The actuator has a first working surface accessible from the elevational outer opening of the footing assembly and a second working surface accessible from the underside opening of the footing assembly for actuating the arcuate rack and pinion gears.

In another embodiment of the invention, a second linkage is further included and extends from the second end of the semi-circular periphery of the arcuate rack with a distal end of the second linkage extending into the footing assembly, and a second actuator is further included and coupled to the arcuate rack through a distal end of the second linkage, the second actuator is positioned within the footing assembly and further includes a first working surface accessible from the elevational outer opening and a second working surface accessible from the underside opening, the second actuator cooperates with the first actuator to activate the arcuate rack and pinion gears.

In another embodiment of the invention, a piston driven controller having a platform for receiving the footing assembly is further included. The platform includes a through hole and a piston at the through hole for piston movement between an extending position and a retracting position, the piston within the footing assembly drives the actuator at the second working surface when the piston is in the extending position. In another embodiment, a torso assembly is further included and in mechanical communication with the footing assembly allowing movement of the torso assembly in relation to the footing assembly.

In yet another embodiment of the invention, an arm appendage is further included and a shoulder pin in the torso assembly is further included for coupling the arm appendage to freely move about the shoulder pin swinging the arm appendage out away from the torso assembly when the torso assembly moves in relation to the footing assembly. In another embodiment, a rack gear is further included and positioned within the torso assembly having an abutment surface for engaging the arm appendage and driving the arm appendage to swing to an elevated position from the torso assembly when the torso assembly is moved in relation to the footing assembly.

In another embodiment of the invention, a toy figure includes a handle having a first end, a platform assembly coupling to the first end of the handle for receiving a toy with a footing assembly having one or more binding tabs and an actuator with a working surface accessible through an actuator access opening, the platform assembly having a first end and a second end and incorporating a plate between first and second ends for supporting the received footing assembly. A binding assembly disposed adjacent the platform assembly is further included and includes a tension clip coupled at the first end of the platform assembly extending beyond the plate for capturing at least one of the one or more binding tabs between the tension clip and the plate exerting a downward force on the binding tabs coupling the received footing assembly to the platform assembly. A manual control element is disposed at the handle, the manual control element includes an actuating point extending into contact with the working surface of the actuator of the footing assembly at the actuator access opening, the manual control element drives movement of the toy figure through its footing assembly.

In another embodiment of the invention, the binding assembly further includes a stationary clip affixed at the second end of the platform assembly opposite the tension clip and extending beyond the plate for capturing at least one of the one or more binding tabs of the footing assembly. In another embodiment, one or more projections at the plate are further included, and the footing assembly further includes one or more apertures for mating with the one or more projections.

In another embodiment of the invention, the platform assembly further includes a through hole and the manual control element further includes a piston driven to extend at the through hole within the received footing assembly at the actuator access opening and into contact with the working surface of the actuator of the footing assembly for activating the toy. In yet another embodiment, the manual control element further includes a cam follower coupled to an end of the piston, a cam assembly having a ramped cam surface in mechanical communication with the cam follower, and a trigger element coupled to the cam assembly for driving the cam follower along the cam surface and the coupled piston to extend at the through hole with the piston actuating the toy figure through its footing assembly.

In another embodiment of the invention, a toy figure assembly includes a handle having a first end and a platform assembly coupling to the first end of the handle for receiving a toy with a footing assembly having an elevational outer opening, and an underside opening, the platform assembly including one or more through holes. A piston at the one or more through holes of the platform assembly, a cam follower coupled to an end of the piston, and a cam assembly having a ramped cam surface in mechanical communication with the piston and cam follower are further included. A trigger element is also included and coupled to the cam assembly for movement of the cam assembly generally laterally across the handle as a user moves the trigger element laterally driving the cam follower along the cam surface and the coupled piston through the through hole into the underside opening of the received footing assembly for actuating the toy.

In another embodiment of the invention, a second piston is further included having a second cam follower coupled to an end of the second piston and a second ramped cam surface is also included at the cam assembly positioned adjacent the first cam surface and ramped in a direction opposite the first ramped cam surface. The second cam surface mechanically communicates with the second piston and second cam follower to alternately drive the first and second pistons up and down through the through holes of the platform assembly.

In yet another embodiment of the invention, a second trigger element is further included and a toggle linkage coupling the second trigger element to the first trigger element is also included for cooperatively driving the cam assembly laterally back and forth as the first and second trigger elements are alternately moved laterally back and forth by the user. In yet another embodiment, a spring biased clip is further included and in mechanical communication with the platform for securing the received footing assembly to the platform. In still yet another embodiment, one or more shroud barriers is further included and in communication with the platform assembly adjacent the received footing assembly denying the user access to the elevational opening of the footing assembly when the controller is secured to the footing assembly.

BRIEF DESCRIPTION OF THE DRAWINGS

For the purpose of facilitating an understanding of the inventions, the accompanying drawings and description illustrates a preferred embodiment thereof, from which the inventions, structure, construction and operation, and many related advantages may be readily understood and appreciated.

FIG. 1B illustrates the torso assembly of the toy figure moving in a first direction in relation to the footing assembly; while

FIG. 6A is a perspective view of the toy figure coupled to a piston driven controller illustrating a platform assembly for receiving the footing assembly of the toy figure; with FIG. 6B illustrating the torso assembly moved to the first position in relation to the footing assembly; while

FIG. 7A is a perspective view of the controller illustrating a first trigger pulled to extend a first piston when moving the torso assembly to the first position; while FIG. 7B illustrates a second trigger pulled to extend a second piston moving the torso assembly to the second position;

FIG. 9A is a view of the piston driven controller illustrating first and second trigger elements coupled together and to the cam assembly illustrating the first trigger element extending the first piston; while FIG. 9B illustrates the second trigger extending the second piston;

FIG. 10A is a perspective view of an alternative embodiment of the toy figure illustrating a torso assembly abutting a footing assembly along diagonal plane A-A; while

FIG. 11A is a rear perspective view of the alternative embodiment illustrating an actuator within an elevational opening at the footing assembly; while

FIG. 17A is a perspective view of a forth alternative embodiment of the toy figure illustrating a channel or track element linked to the footing assembly and providing a track in which an appendage follower engages; and FIG. 17B illustrates a torso assembly moved to a first position and the appendage follower traveling in the track and flexing the arm appendage;

FIG. 18A is perspective view of an alternative embodiment of the controller employed to activate the toy figure illustrating a manual control element including actuator arms, while

FIG. 19A is a perspective view of a second alternative embodiment of the controller employed to activate the toy figure illustrating an elongated handle and affixed platform assembly with a manual control element including an actuator arm, while

DETAILED DESCRIPTION OF THE EMBODIMENTS

The following description is provided to enable those skilled in the art to make and use the described embodiments set forth in the best modes contemplated for carrying out the inventions. Various modifications, however, will remain readily apparent to those skilled in the art. Any and all such modifications, equivalents and alternatives are intended to fall within the spirit and scope of the present inventions.

Figure 1A:
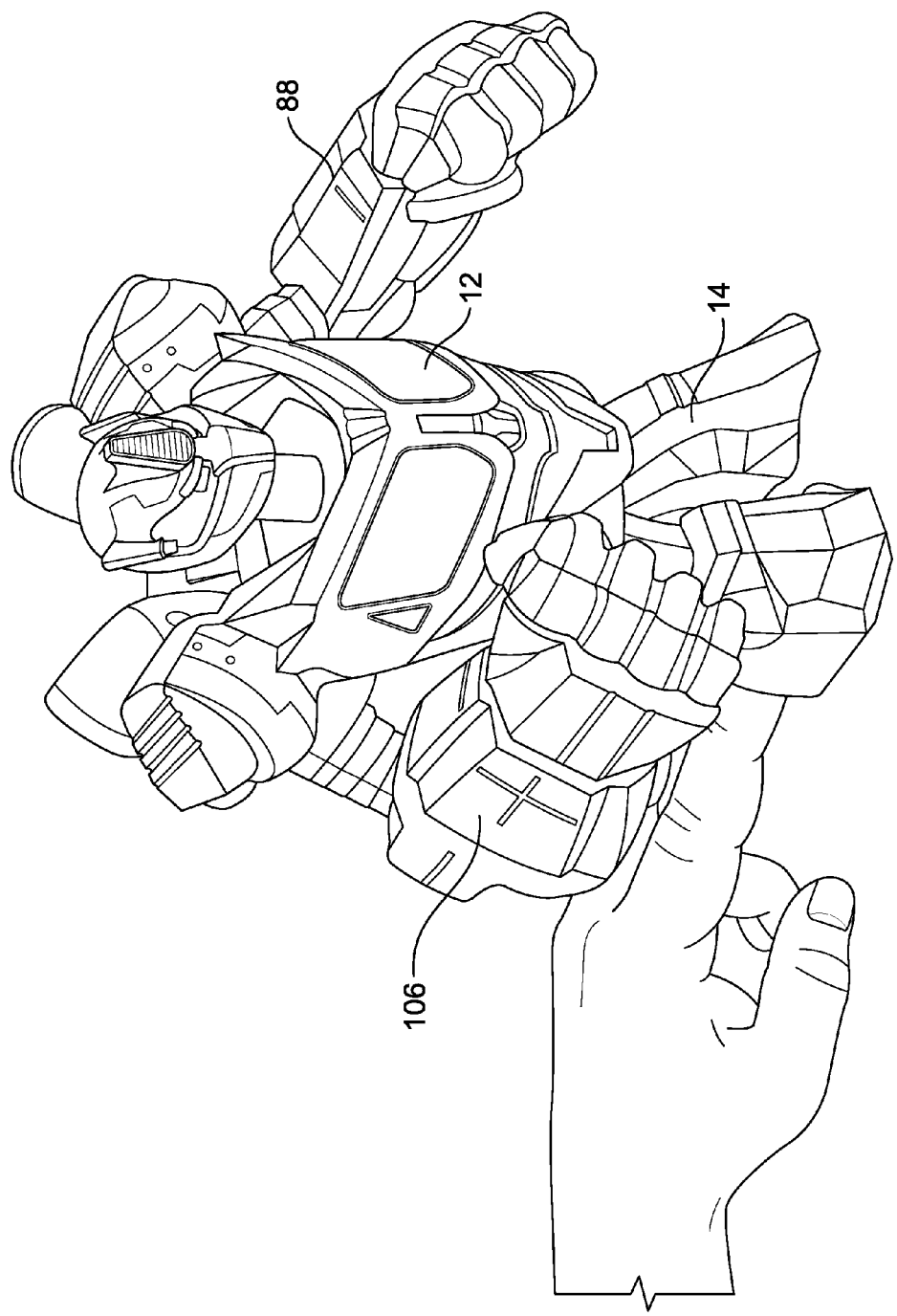
FIG. 1A is a perspective view of an embodiment of a toy figure of the present invention illustrating a torso assembly in mechanical communication with a footing assembly.
Figure 1B:
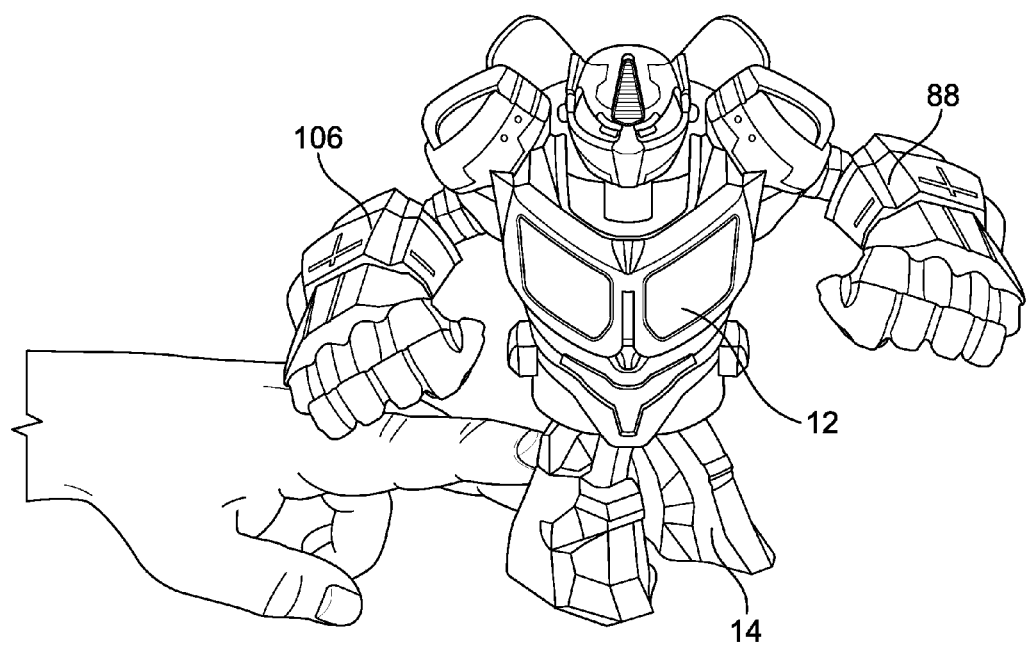
Figure 1C:
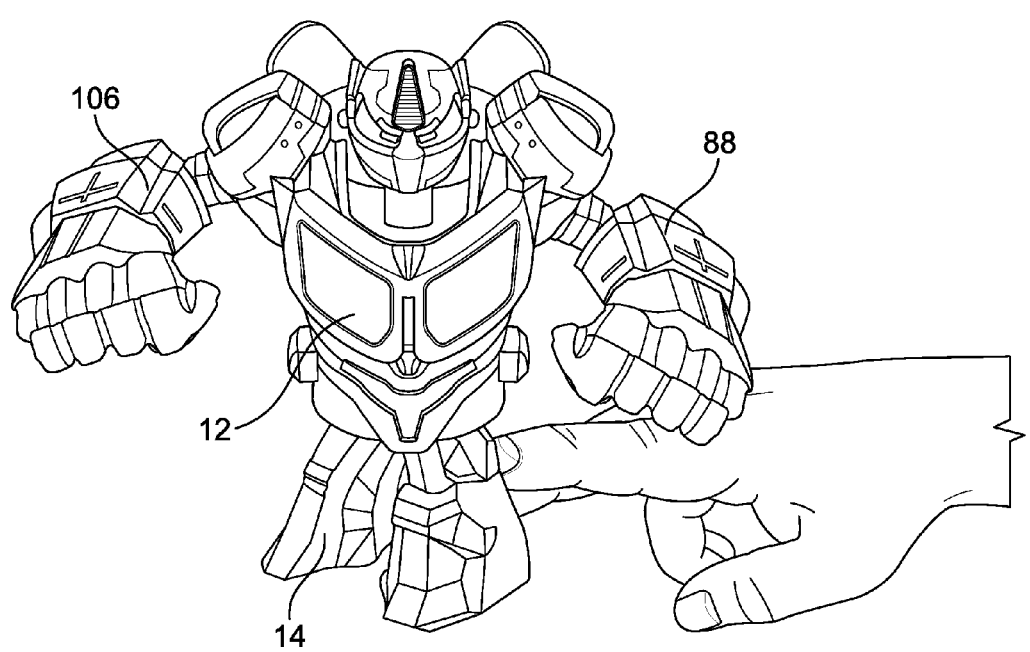
FIG. 1C illustrates the torso assembly moving in a second direction in relation to the footing assembly.
Figure 6A:
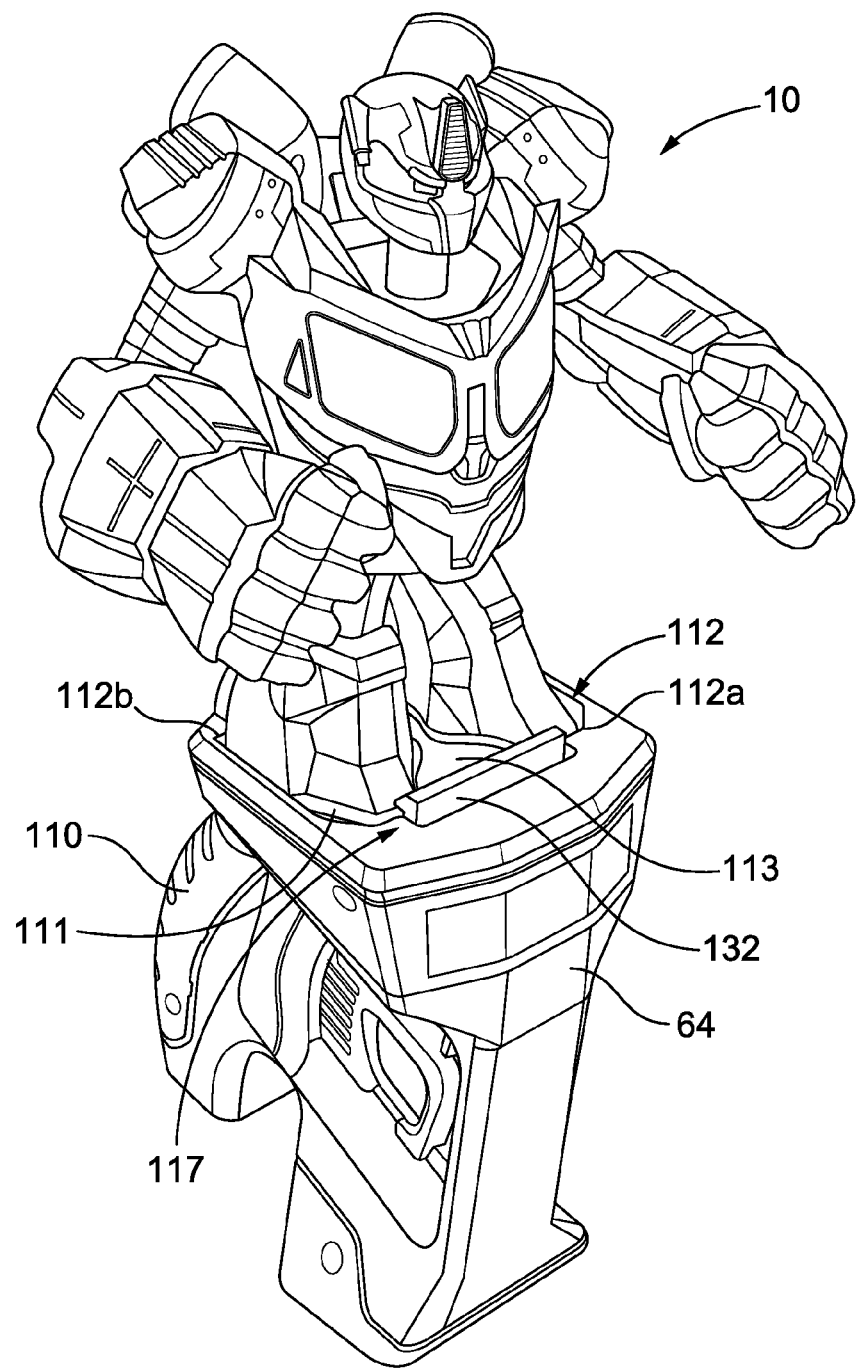
Figure 6B:
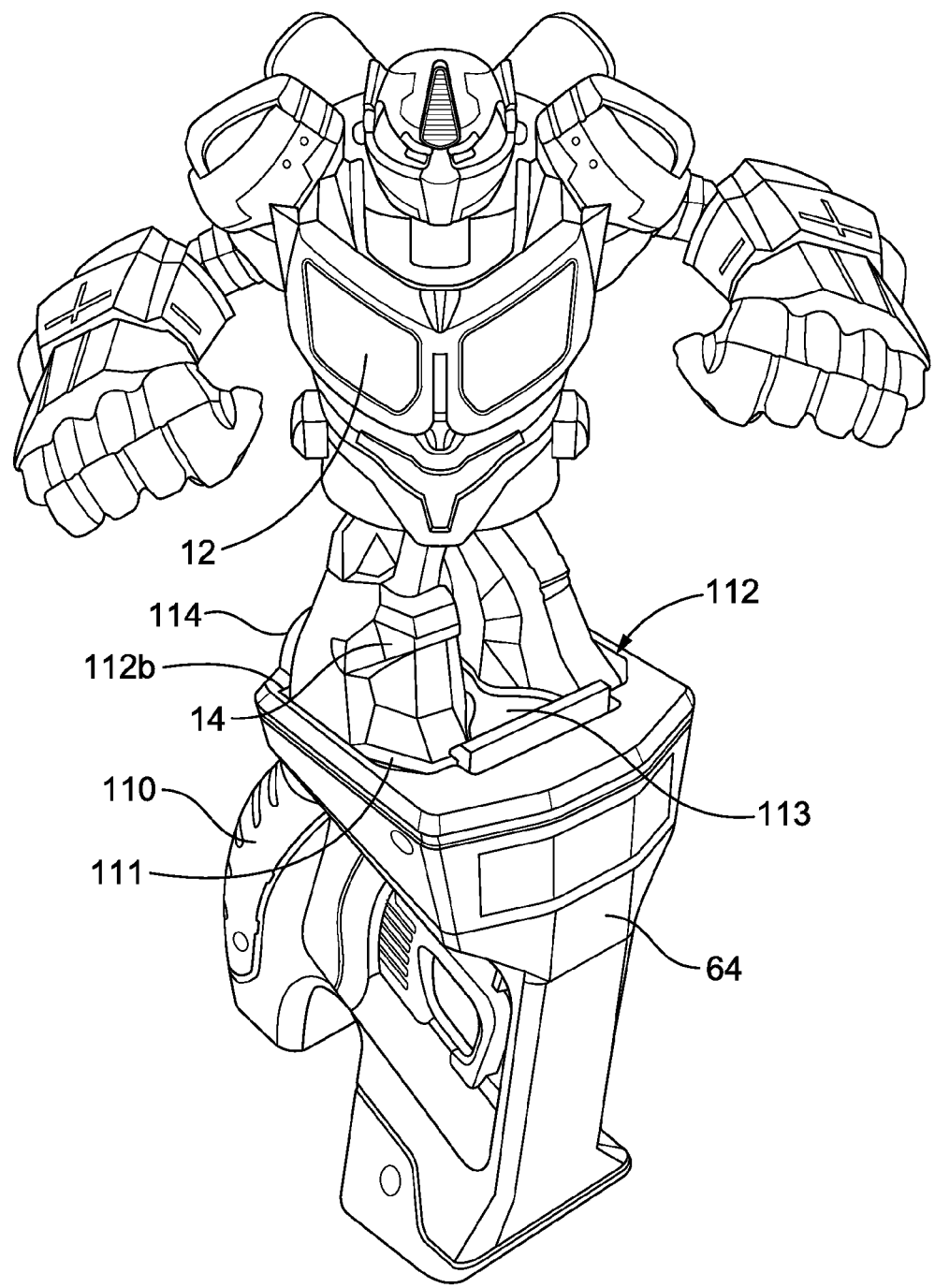

A toy FIG. 10, as seen in FIGS. 1A-1C employs a footing assembly in combination with a dual action actuator employing a working surface accessible through one or more actuator access openings of the footing assembly for driving an action movement of the toy figure by both a user's fingers and a variety of controllers secured to the footing. The toy as seen in 6A-6B, employs a dual action actuator with two working surfaces each accessible through a separate opening for manual and controller activation of the same action movements. The toy FIG. 10 includes a torso assembly in mechanical communication with a footing assembly having an elevational outer opening providing access to a first working surface of the actuator and an underside opening providing access to a second working surface of the actuator for driving toy movement by both a user's fingers, as seen in FIGS. 1A-1C, and a piston driven controller secured to the footing, as seen in FIGS. 6A-6B.

The torso assembly 12, as seen in FIGS. 1A-1C is movably coupled to the footing assembly 14 allowing movement of the torso assembly in relation to the footing assembly. In the present described embodiment, the torso assembly rotates around the footing assembly, as seen in FIGS. 1B and 1C, however it is also contemplated that the torso assembly can pivot along various angles with respect to the footing assembly, as see in FIGS. 10A-10B, and discussed in more detail below.

Figure 10A:
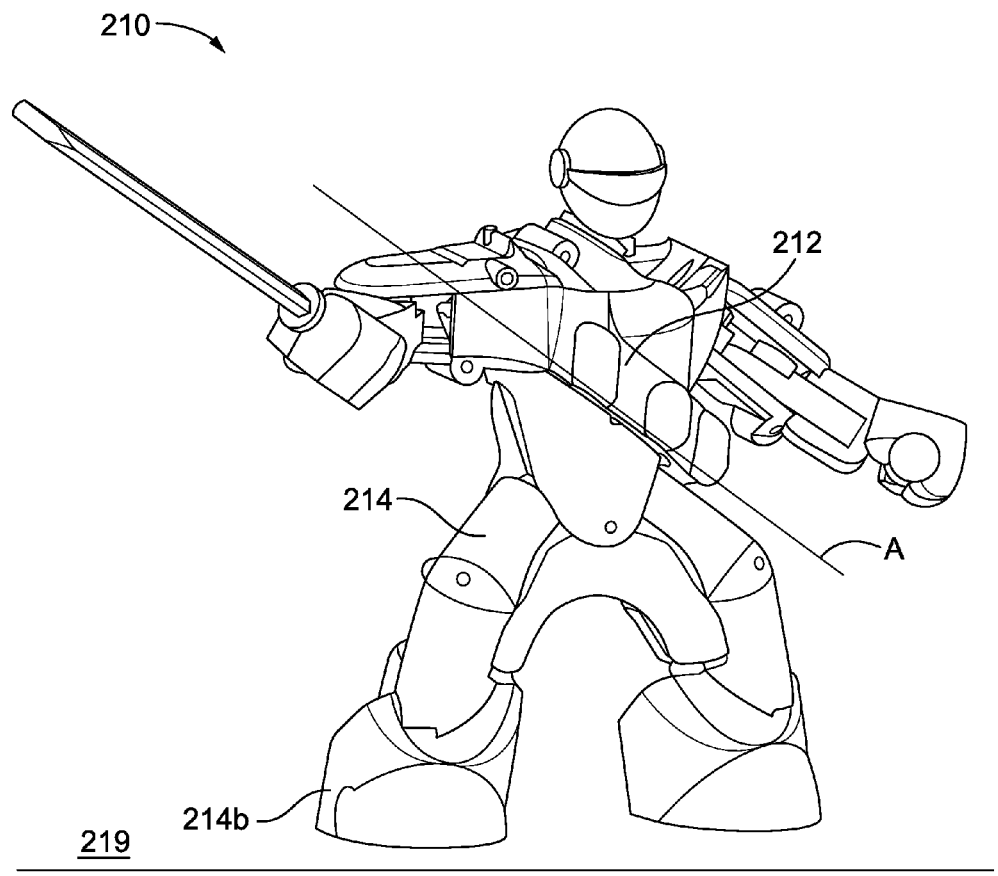
Figure 10B:
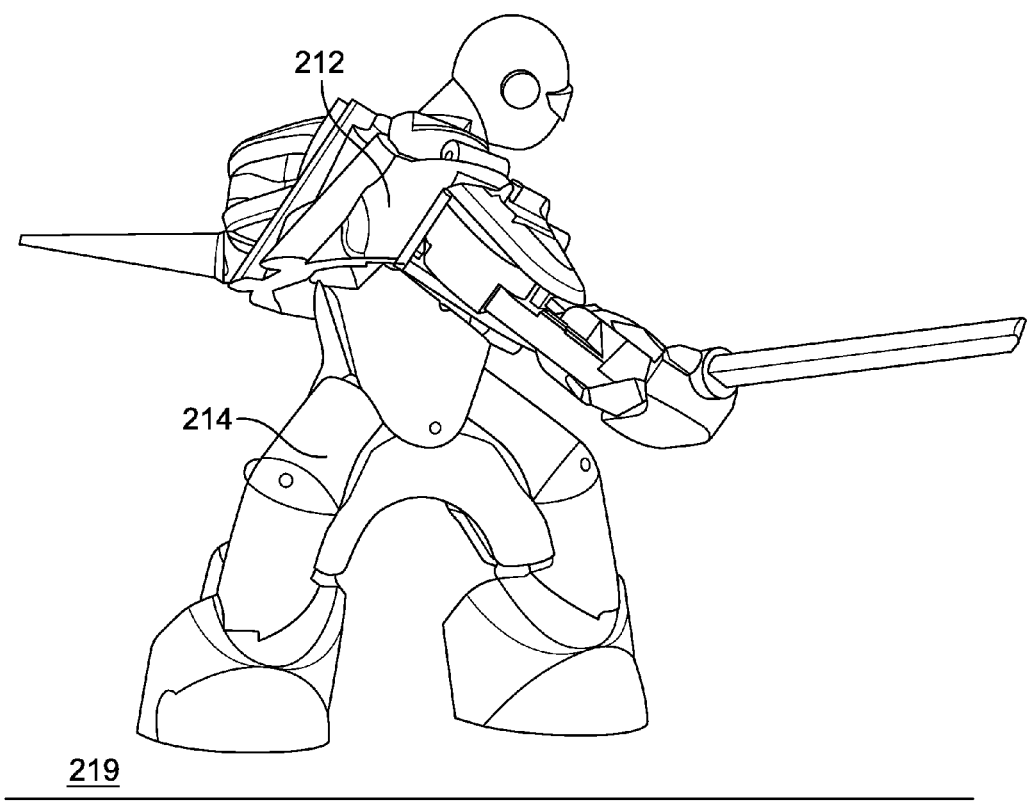
FIG. 10B illustrates the torso assembly pivoting in relation to the footing assembly along plane A-A.
Figures 20, 21:
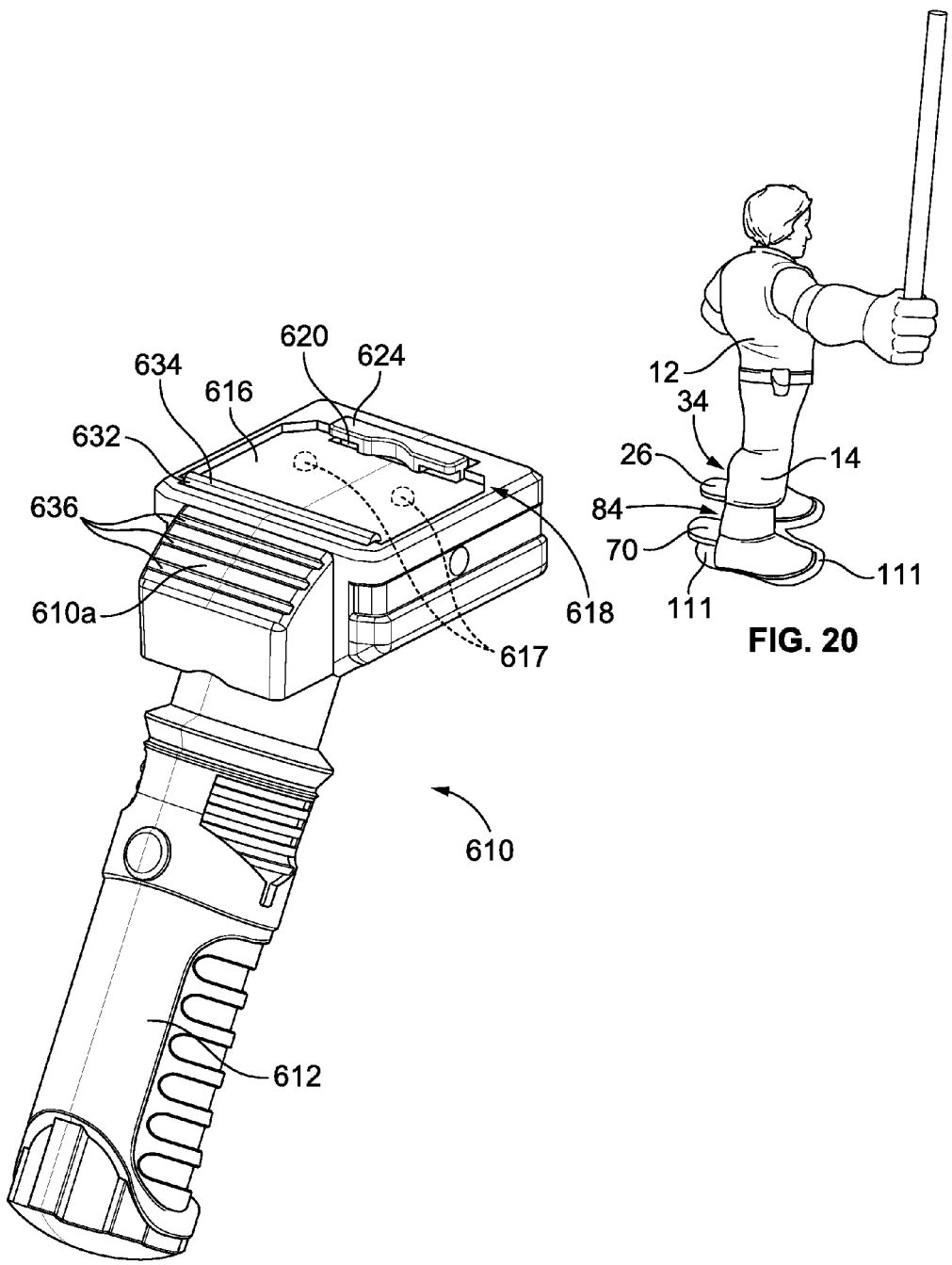
FIG. 20 is a perspective view of the fifth alternative embodiment of the toy figure illustrating elongated actuators.
FIG. 21 is a perspective view of a third alternative embodiment of the controller employed to activate the toy figure illustrating a binging assembly for securing the toy figure to the platform assembly and a finger stability portion adjacent the platform assembly providing an angled surface on which to align a user's fingers for easy and accurate manipulation of the actuators of the toy figure.

The torso assembly 12 is generally manufactured from a hard durable plastic material which can be molded into various shapes and sizes, and in the present described embodiment, as seen in FIGS. 1A-1C, the torso assembly is shaped to mimic a torso having oversized chest armor giving the toy FIG. 10 the appearance of being ready for battle. It is also contemplated that the torso assembly can be molded into a number of other suitable shapes and sizes including a torso assembly crafted to look like a ninja warrior, as seen in FIGS. 10A-10B, or a muscle man, as seen in FIG. 20, etc.

Figure 2A:
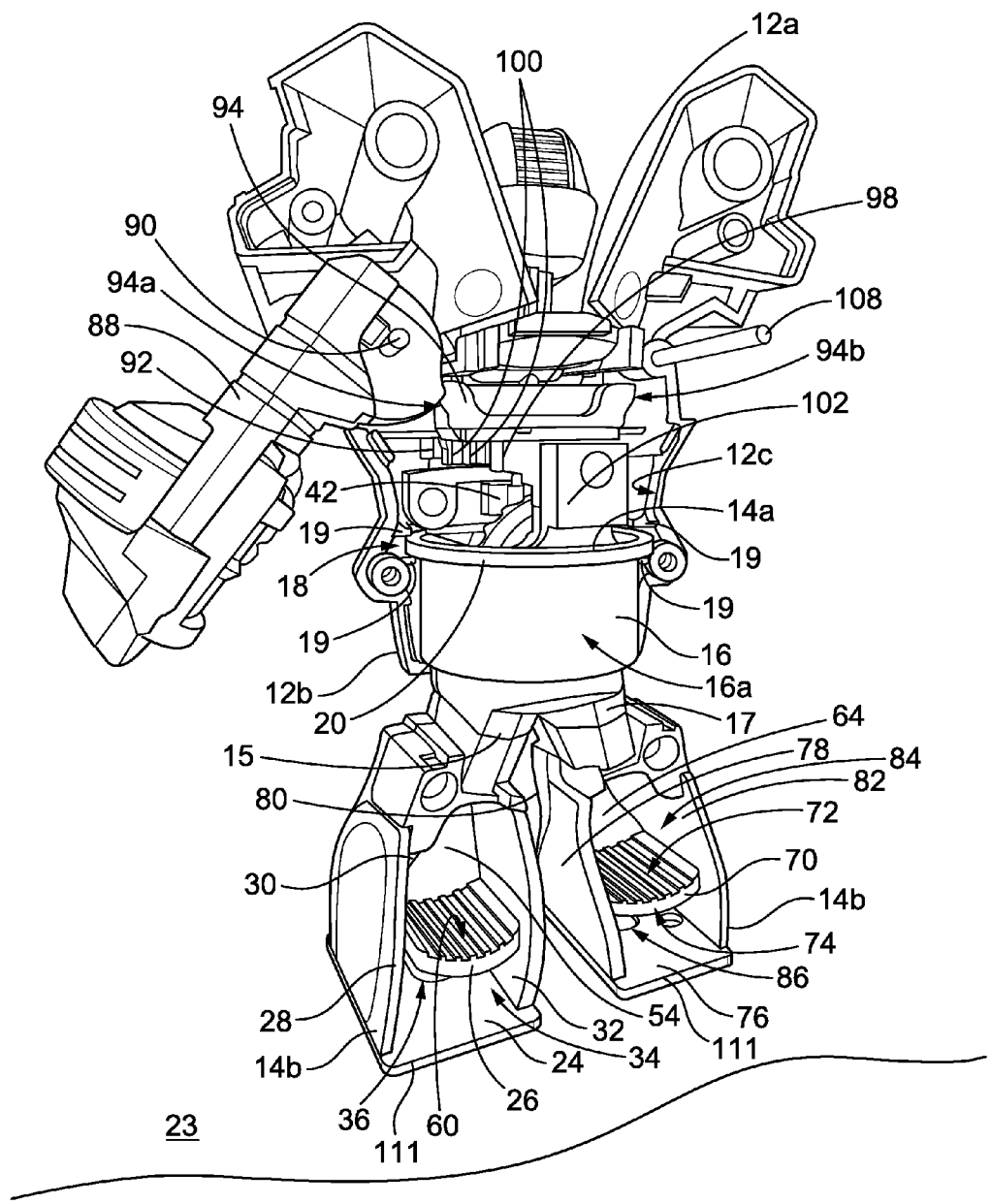
FIG. 2A is a rear perspective view of the toy figure with a portion of the torso and footing assembly removed illustrating an actuator within the footing assembly having a first and second working surface with the first working surface accessible from an elevational opening.
Figure 2B:
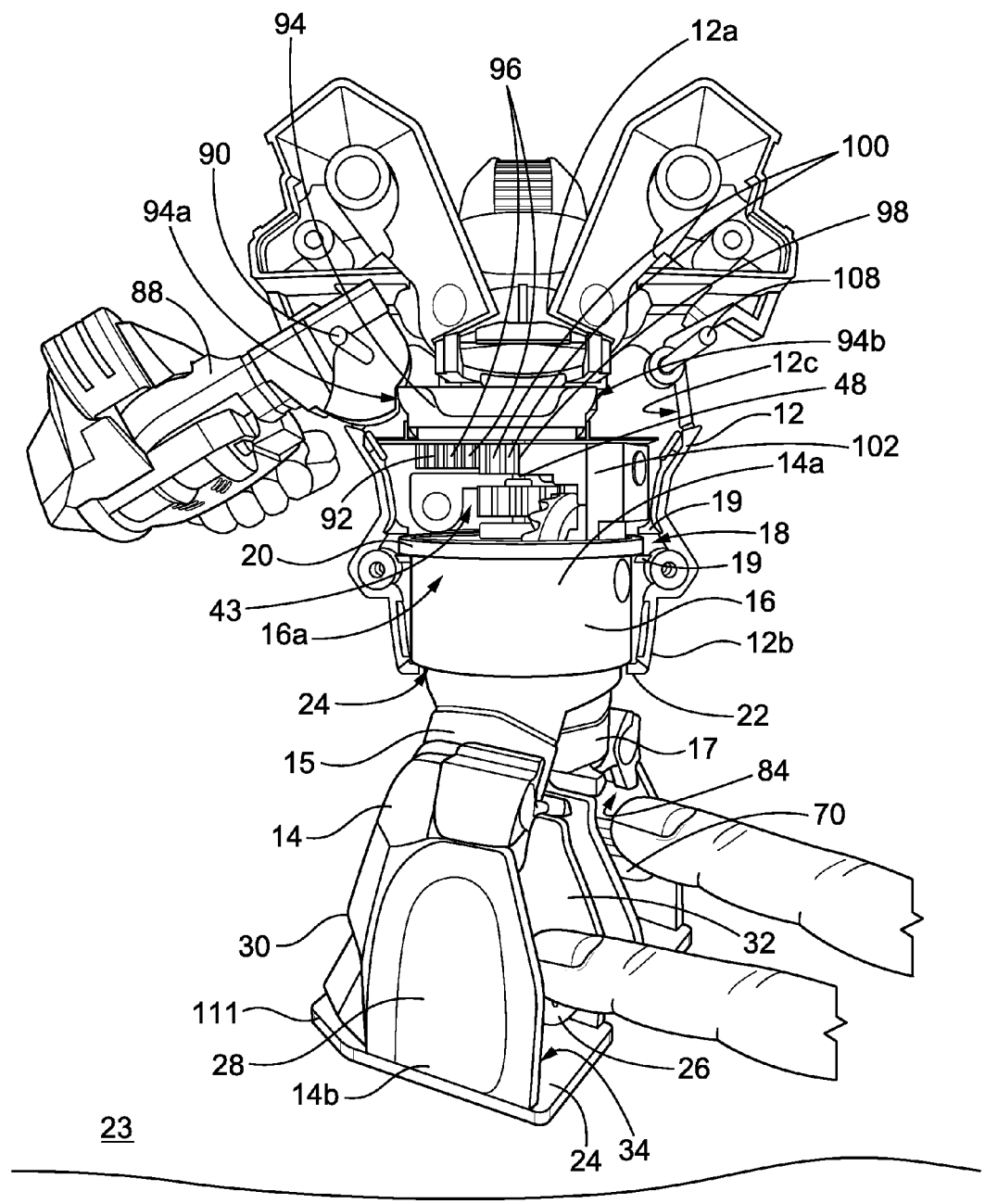
FIG. 2B illustrates activation of the actuator at the first working surface by a user's fingers moving the torso assembly to a first position in relation to the footing assembly.

In the present described embodiment, as seen in FIGS. 1A-1C, the torso assembly rotates around the footing assembly and partially envelopes a portion of the footing assembly when coupled. As seen in FIGS. 2A-2B, the torso assembly 12 includes a first end 12a, a second end 12b and is coupled at the second end 12b to a cylindrical collar element 16 of the footing assembly and rotates around the collar element when moved in relation to the footing assembly. The torso assembly includes an inside surface 12c and a circumferential groove or track 18, defined by one or more circumferential lips 19, along a perimeter of the inside surface 12c of the torso.

The collar element 16 includes an outside surface 16a and a circumferential lip 20 extending along a cylindrical perimeter of the outside surface 16a of the collar element 16. The groove or track 18 captures the lip 20 when the torso assembly is coupled to the footing assembly, and the circumferential lip 20 rides along the groove or track 18 as the torso assembly is moved and rotated around the footing assembly, as seen in FIG. 2B. Additionally, a torso ledge 22 at the second end 12b of the torso assembly rides along a bottom edge 24 of the cylindrical collar element 16 to further add stability to the coupling between the torso assembly and the footing assembly as the torso assembly is moved and rotated in relation to the footing assembly.

The footing assembly 14 is also generally manufactured from a hard durable plastic material which can be molded into various shapes and sizes. In the present described embodiment, the footing assembly includes a first end 14a and a second end 14b, as seen in FIGS. 2A and 2B. The footing assembly at the first end 14a includes the collar element 16, as described above, and at the second end 14b is shaped to mimic oversized legs extending from the collar element 16 and equipped with armor plates to give the appearance of an action toy ready for battle. It is also contemplated that the footing assembly can be molded into a number of other suitable shapes and sizes, for example omitting the collar element at the first end 14a and having thinner legs at the second end 14b to mimic the look of ninja warrior, as seen in FIGS. 10A-10B, etc.

The footing assembly 14 includes an actuator access opening for operating the actuator 26 within the footing assembly. The actuator 26 includes a working surface accessible through the actuator access opening of the footing assembly for activating the toy and moving the torso assembly in relation to the footing assembly. In the present described embodiment, the actuator access opening of the footing assembly includes an elevational outer opening and an underside opening with the working surface accessible from the elevational outer opening and/or the underside opening.

In the present described embodiment, the second end 14b of the footing assembly includes a first footing portion 15 and a second footing portion 17, as seen in FIGS. 2A-2B. It is also contemplated that the footing assembly at the second end 14b can include one single footing portion extending from the collar element 16 rather than two footing portions 15 and 17. A single footing portion can provide access to first and second working surfaces of one or more dual action actuators accessible through a single elevational outer opening and a single underside opening at the single footing portion for driving toy movement through both a user's fingers, and various controllers secured to the single footing portion, including a piston driven controller.

Figure 3:
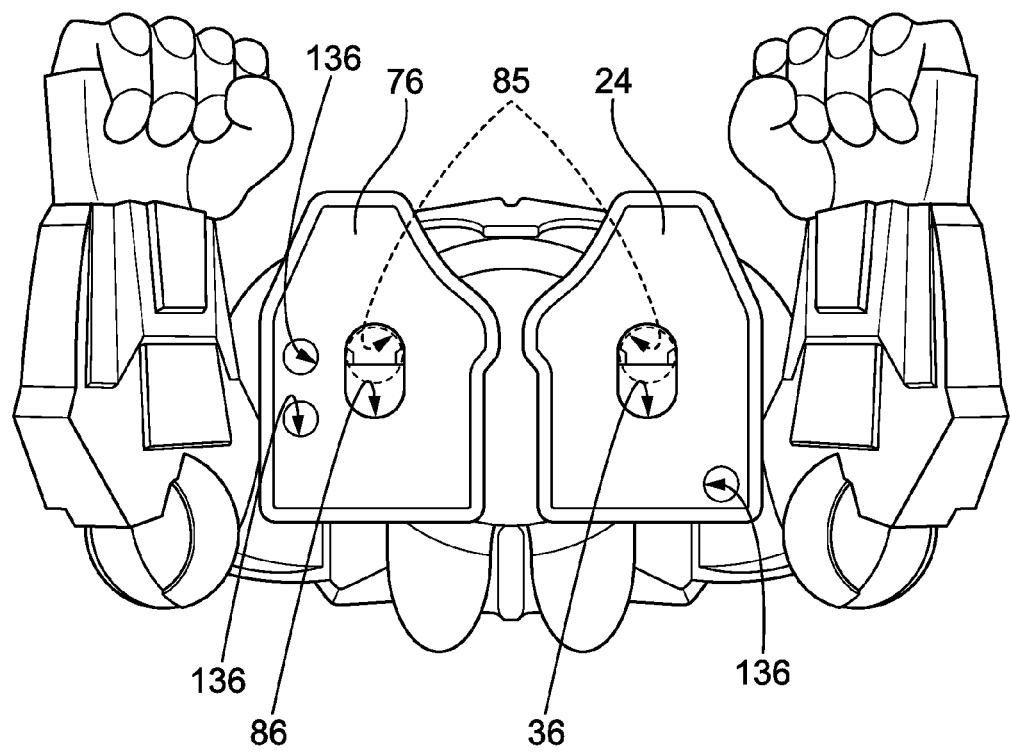
FIG. 3 is a bottom view of the footing assembly illustrating an underside opening of the footing assembly.

In the present described embodiment, the first footing portion 15 of the footing assembly 14 includes an elevational outer opening, as seen in FIGS. 2A and 2B, and an underside opening, as seen in FIG. 3, for accessing two working surfaces of the dual action actuator 26 from two separate openings for manual and controller activation of the same action movements in the toy FIG. 10. The first portion 15 of the footing assembly includes a plate 24 which can rest on a surface 23 and hold the FIG. 10 upright on the surface, as seen in FIGS. 2A and 2B.

The first footing portion 15 includes three side walls 28, 30 and 32, respectively, which combine with the plate 24 to define the elevational outer opening 34 in the footing assembly, as seen in FIGS. 2A-2B. The elevational outer opening 34 is generally elongated, in the vertical sense, allowing a user's fingers, and a manual actuator, manual access into the opening 34. The first footing portion 15 also includes the underside opening 36 at the plate 24, as seen in FIGS. 2A & 3. The underside opening is generally an elongated through hole, cut into the plate 24, for providing access to the actuator 26 through the underside opening 36.

Figure 4:
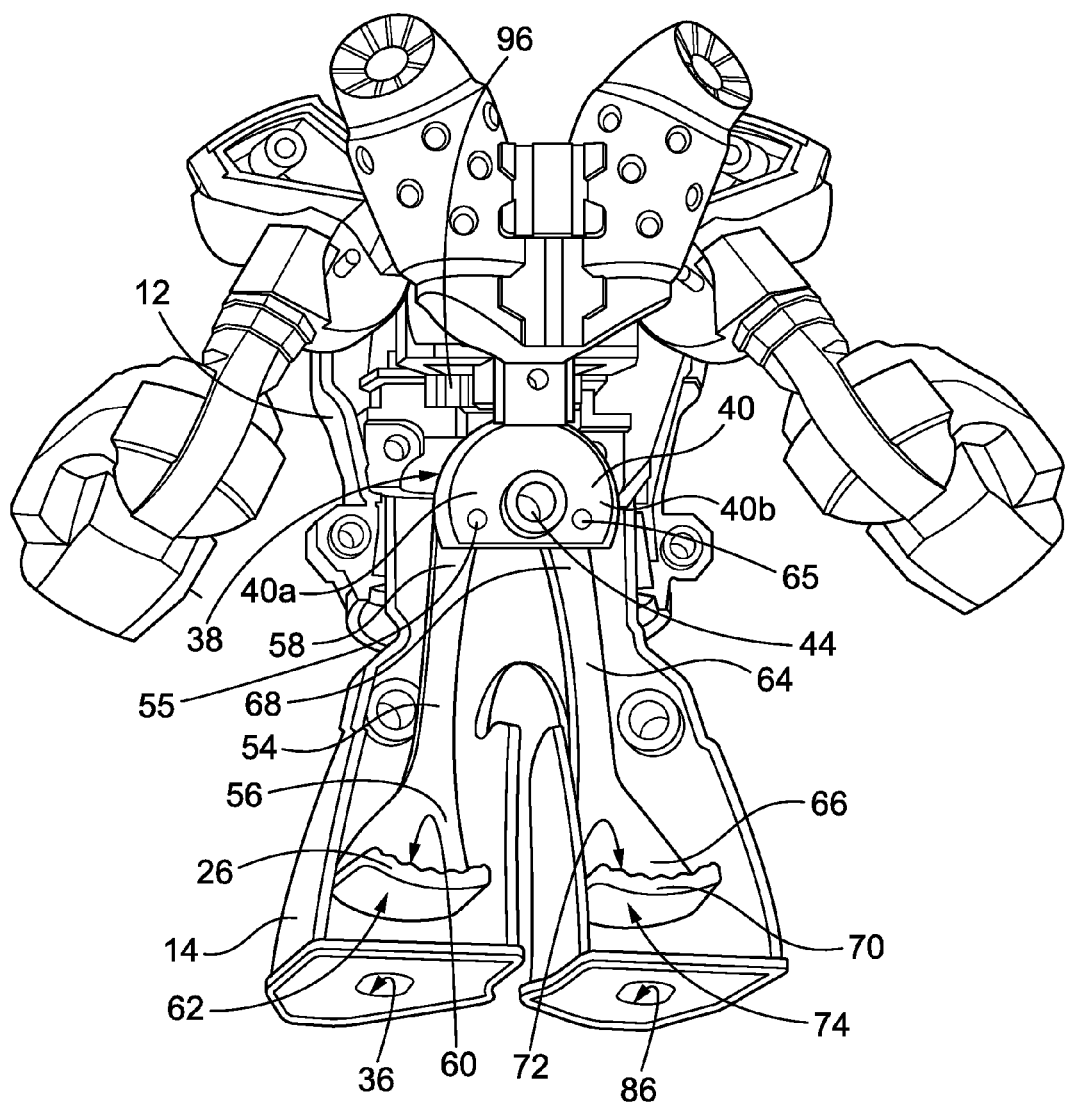
FIG. 4 is a rear perspective view of the toy figure with a portion of the torso and footing assemblies removed illustrating an arcuate rack gear mounted on a first axle and coupled to the actuator through a linkage.
Figure 5:
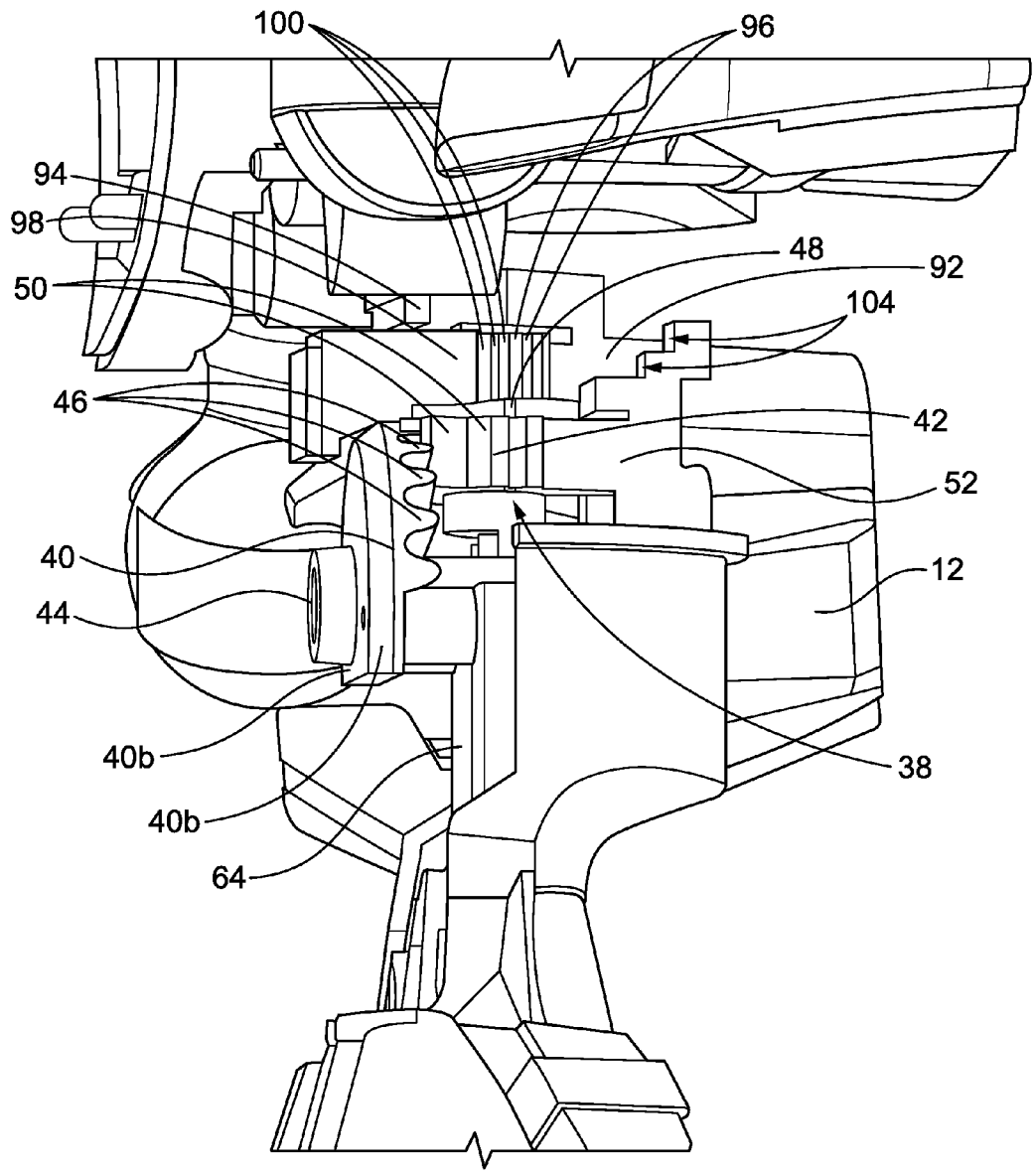
FIG. 5 is a perspective view of a gear assembly within the torso assembly.

A gear mechanism 38, as seen in FIGS. 4 & 5, is linked to the actuator 26 and drives the movement of the torso assembly 12 in relation to the footing assembly 14. In the present described embodiment, the gear mechanism 38 includes at least an arcuate rack gear 40 and a torso pinion gear 42, as best seen in FIG. 5. The arcuate rack gear 40 is mounted on a first axle 44 and has a semi-circular periphery extending between a first end 40a and a second end 40b. The arcuate rack gear 40 includes gear teeth 46 arranged from the first end 40a to the second end 40b of the semi-circular periphery of the arcuate rack gear. The arcuate rack gear 40 rotates or pivots around the first axle 44 when driving movement of the torso assembly with respect to the footing assembly. The gear assembly is generally manufactured from a hard plastic material for cost effective manufacture and reliable durability in use.

In the present described embodiment, the torso pinion gear 42, as seen in FIG. 5, is within the torso assembly and in mechanical communication with the arcuate rack gear 40 for driving the movement of the torso assembly in relation to the footing assembly. The torso pinion gear 42 is mounted on a second axle 48, and disposed adjacent the arcuate rack gear 40 within the torso assembly 12 and coupled to the torso assembly. In the present described embodiment, the second axle 48 is disposed generally perpendicular to the first axle 46, however it is also contemplated that the second axle 48 can be disposed at any number of angles in relation to the first axle 44 including at a diagonal.

The torso pinion gear 42 includes gear teeth 50 arranged along at least a portion of the generally circular pinion gear 42 for meshing with the gear teeth 46 of the arcuate rack gear 40. Additionally, the torso pinion gear 42 is integral with (or alternatively coupled to) a connecting portion 43 which connects to the torso assembly for securing the torso pinion gear 42 to the torso assembly. It is contemplated that the connecting portion 43 can be molded to any variety of shapes and sizes suitable for securely connecting the torso pinion gear 42 to the torso assembly for driving movement of the torso assembly when the torso pinion gear is rotated.

In the present described embodiment, a bracket element 52 is integral with, or alternatively coupled to, the torso pinion gear, as seen in FIG. 5, for securing the torso pinion gear to the torso assembly. The bracket element 52 couples to the torso assembly 12 at the inside surface 12c for securing the connection between the torso pinion gear 42 and the torso assembly 12. The bracket element 52 moves the torso assembly 12 in relation to the footing assembly 14 as the connected torso pinion gear 42 is rotated, as seen in FIG. 2B.

In the present described embodiment, as seen in FIG. 4, a linkage 54 extends between the torso assembly 12 and the footing assembly 14. The linkage 54 extends between the torso assembly at the first end 40a of the semi-circular periphery of the arcuate rack gear 40, with a distal end 56 of the linkage extending into the footing assembly 12. A proximate end 58 of the linkage 54 couples to the arcuate rack gear 40, and the distal end 56 of the linkage 54 secures to the actuator 26 providing a mechanical connection between the actuator 26 and the gear assembly 38.

In the present described embodiment, the proximate end 58 of the linkage 54 is mounted on a pin 55 which couples to the arcuate rack gear 40, providing a pivot point at the connection between the linkage 54 and the arcuate rack gear 40. This pivoting connection between the linkage 54 and the arcuate rack gear 40 allows the linkage to pivot or rotate slightly at pin 55 so the linkage can remain disposed in a generally upright position held fairly snug within the footing assembly as the actuator is repeatedly activated causing and the arcuate rack gear to repeatedly rotate or pivot back and forth on the first axle 44.

The linkage 54 is integral with the actuator 26, however it is also contemplated that the actuator 26 is coupled through a distal end of the linkage 54, as described above. The actuator 26 is disposed within the footing assembly 12, as seen in FIG. 4, and includes a working surface accessible from the actuator access opening for actuating the gear assembly and driving movement of the torso assembly in relation to the footing assembly. In the present described embodiment, the working surface includes a first working surface 60 and a second working surface 62 for actuating the gear assembly and driving movement of the torso assembly in relation to the footing assembly at both first and second working surfaces, 60 & 62, respectively.

Figure 18A:
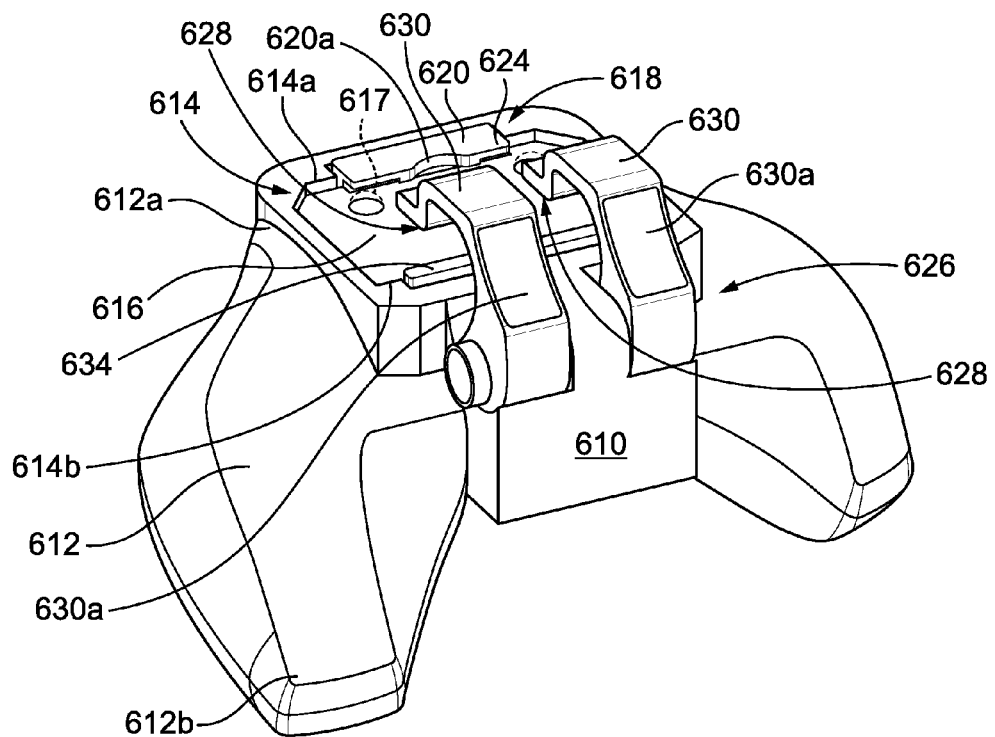
Figure 19A:
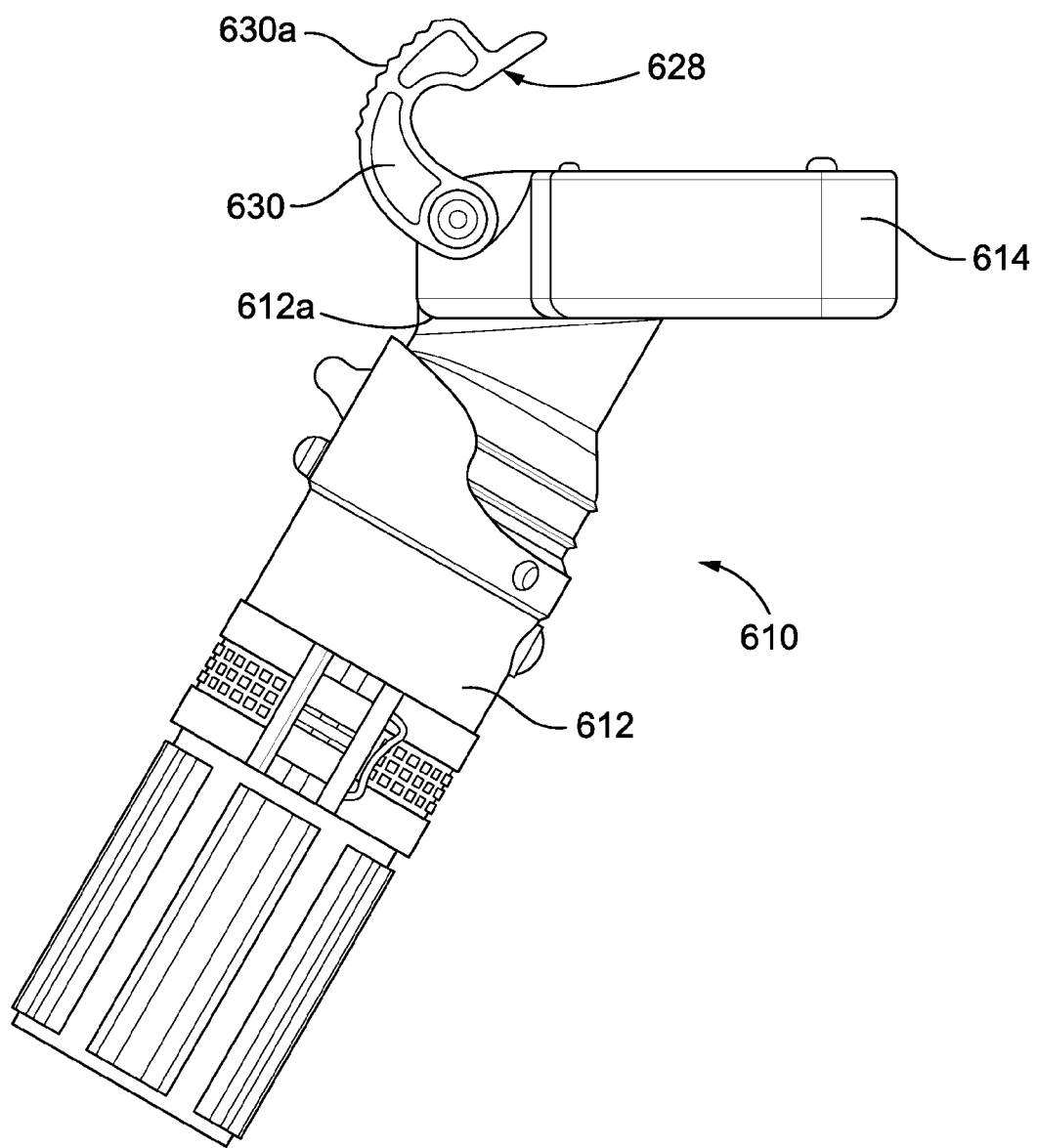
Figure 19B:
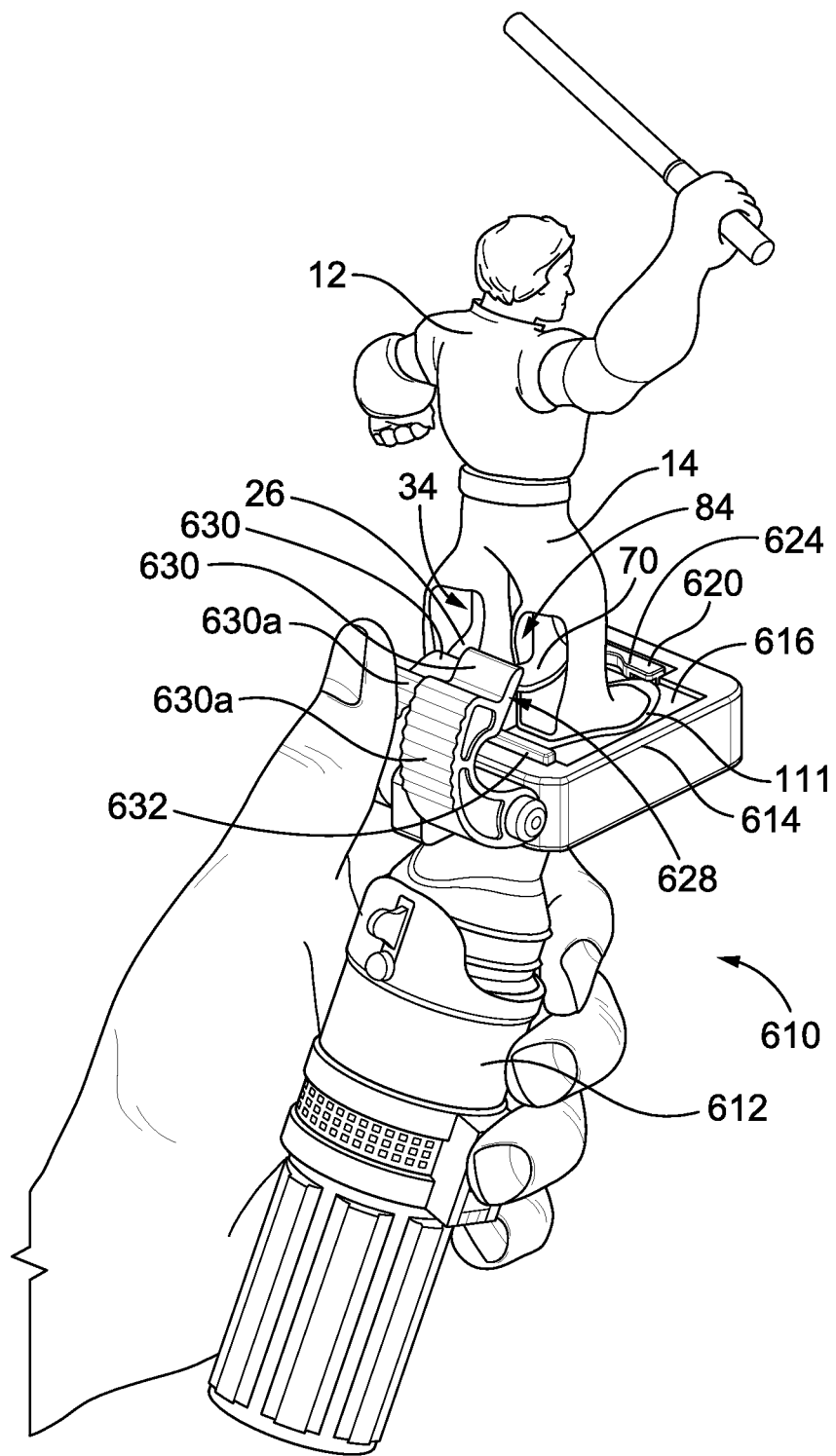
FIG. 19B illustrates the toy figure coupled at the footing assembly to the second alternative controller embodiment and activated by an actuator arm.

The first working surface 60 is accessible from the elevational outer opening 34, as seen in FIG. 2A and is activated manually by a user's fingers as seen in FIG. 2B, and/or a controller with a manual control element driving the actuator at the elevational opening of the footing assembly, as seen in FIGS. 18A and 19B, and discussed in more detail below. The second working surface 62 at the actuator 26 is accessible through the actuator access opening. The actuator access opening further includes the underside opening 36, and the second working surface 62 is accessible from the underside opening 36, as seen in FIG. 4, with a piston driving the actuator at the second working surface through the underside opening of the footing assembly. A piston driven controller 64 is secured to the footing assembly of the toy FIG. 10, as seen in FIG. 6B, and discussed in more detail below. The dual action actuator 26 with first and second working surfaces, 60 & 62 respectively, accessible through two separate openings, elevational 34 and underside 36, respectively, drive the action movement of the toy FIG. 10 by both a user's fingers, and a manual controller and/or a piston driven controller secured to the footing.

A second linkage 64, as seen in FIG. 4, extends from the second end 40b of the semi-circular periphery of the arcuate rack gear 40 with a distal end 66 of the second linkage 64 extending into the footing assembly 14. In the present described embodiment, the second linkage 64 extends into the second portion 17 of the footing assembly 14, as seen in FIG. 2A. A proximate end 68 of the second linkage 64 is mounted on a pin 65 which couples to the arcuate rack gear 40, providing a pivot point at the connection between the second linkage 64 and the arcuate rack gear 40. Similar to the first linkage 54, the pivoting connection between the linkage 64 and the arcuate rack gear 40 allows the linkage 64 to pivot or rotate slightly at the pin 65 as the arcuate rack gear is repeatedly rotated back and forth at the first axle 44.

The second linkage 64 is held snug within the second footing portion 17 of the footing assembly 14, and a distal end 66 of the second linkage 64 couples to a second actuator 70, as seen in FIG. 4. The pivoting connection between the second linkage 64 and the arcutate rack gear 40 allows the linkage 64 to remain in a generally upright position held fairly snug within the footing assembly as the second actuator 70 is repeatedly activated causing and the arcuate rack gear 40 to repeatedly rotate or pivot back and forth on the first axle 44.

In the present described embodiment, the second linkage 64 is integral with the second actuator 70, however it is also contemplated that the second actuator 70 couples through the distal end 66 of the linkage, as described above. Similar to the first actuator 26, the second actuator 70 is disposed or positioned within the footing assembly 14, as seen in FIG. 4, and in the present described embodiment, the second actuator 70 is disposed or positioned within the second footing portion 17. The second actuator 70 includes a working surface accessible from the actuator access opening. The working surface further includes a first working surface 72 and a second working surface 74, and the second actuator 70 cooperates with the first actuator to activate the arcuate rack and pinion gears driving movement of the torso assembly in relation to the footing assembly.

In the present described embodiment, the second footing portion 17, as seen in FIGS. 2A & 2B, includes a second elevational outer opening and an second underside opening, as seen in FIG. 3, for accessing first and second working surfaces, 72 & 74, respectively of the second dual action actuator 70 for manual and controller activation of the same action movements in the toy FIG. 10.

In the second footing portion 17 of the footing assembly a plate 76 is provided. The plate 76 rests on the surface 23 and cooperates with plate 24 to hold the toy FIG. 10 upright, as seen in FIGS. 2A and 2B. The second footing portion 17 also includes three side walls 78, 80 & 82, which combine with the plate 76 to define the second elevational outer opening 84 in the footing assembly, as seen in FIGS. 2A-2B. The elevational outer opening 84 is generally elongated, in the vertical sense, and allows a user's fingers, and a manual controller, manual access into the opening 84. The second footing portion 17 also includes the second underside opening 86 at the plate 76, as seen in FIGS. 2A & 3. The second underside opening 86 is generally an elongated through hole, cut into the plate 76 for providing access to the second actuator 70 through the underside opening 86.

The first working surface 72 of the second actuator 70 is accessible from the elevational outer opening 84, as seen in FIG. 2A and is activated manually by a user's fingers as seen in FIG. 2B and/or by a manual controller as seen in FIG. 18A, and discussed in more detail below. The second working surface 74 is accessible from the underside opening 86, as seen in FIG. 4, and is activated by a piston driven controller 64 secured to the toy FIG. 10, as seen in FIG. 6B, and discussed in more detail below. The second dual action actuator 70, with first and second working surfaces, 72 & 74 respectively, accessible through two separate openings, drive the action movement of the toy FIG. 10 by both a user's fingers, and a manual controller and a piston driven controller secured to the footing.

In the present described embodiment, the second actuator 70 cooperates with the first actuator 26 to activate the arcuate rack 40 and torso pinion gear 42 driving movement of the torso assembly in relation to the footing assembly. First and second actuators, 26 and 70, respectively, through first and second linkages, 54 and 64, respectively, cooperate to toggle or pivot the arucate rack gear 40 back and forth on the first axle 44 driving the torso pinion gear 42 to move the torso assembly repeatedly back and forth in relation to the footing assembly.

In the present described embodiment, the user contacts and depresses first working surface 60 of actuator 26 to move the torso assembly 12 with relation to the footing assembly to the first position, as seen in FIG. 1B. Alternately, the user contacts and depresses first working surface 72 of the second actuator 70 to move the torso assembly 12 with relation to the footing assembly to the second position, as seen in FIG. 1C. As seen in FIGS. 1A-1C, alternately activating actuators 26 and 70, respectively, alternately move the torso assembly with respect to the footing assembly back and forth (and even rapidly) between the first position, as seen in FIG. 1B and the second position, as seen in FIG. 1C.

In the present described embodiment, the toy FIG. 10 further includes an arm appendage 88 which swings to an elevated punching position, as seen in FIG. 1B, as the torso assembly 12 is moved or rotated with respect to the footing assembly 14. The arm appendage 88 is mounted on a shoulder pin 90 which is secured within the torso assembly, as seen in FIG. 2A. The shoulder pin 90 couples the arm appendage to the torso assembly to freely move about the shoulder pin swinging the arm appendage out away from the torso assembly when the torso assembly moves in relation to the footing assembly. A rack gear 92 is positioned within the torso assembly, as seen in FIGS. 2A-2B, and includes an abutment surface for engaging the arm appendage 88 and driving the arm appendage to swing to an elevated position from the torso assembly when the torso assembly is moved in relation to the footing assembly. In the present described embodiment, abutment element 94 is coupled to the rack gear 92 for providing an abutment surface 94a in which to engage the arm appendage 88 driving the arm to an elevated position. The abutment element 94 is integral with rack gear 92 and moves with the rack gear 92 back and forth laterally within the torso assembly, as seen in FIGS. 2A-2B.

The rack gear 92 includes a row of gear teeth 96 for engaging a footing pinion gear 98 which is linked with the footing assembly 14 and positioned within the torso assembly, as seen in FIGS. 2A-2B. The footing pinion gear 98 includes gear teeth 100 that mesh with the gear teeth 96 of the rack gear 92 for driving the rack gear 92 back and forth laterally across the torso assembly contacting the arm appendage 88 with abutment surface 94a of the rack gear 92, as seen in FIG. 2B.

The footing pinion gear 98 is integral with (or alternatively coupled to) a bracket element 102, as seen in FIGS. 2A-2B. The bracket element 102 is integral with (or alternatively coupled to) the first end 14a of footing assembly providing a linkage between the footing pinion gear 98 and the footing assembly 14. The footing pinion gear 98 is mounted on the second axle 48, as seen in FIG. 2B, and is held stationary and in alignment with the footing assembly 14 as the torso assembly 12 is moved or rotated in relation to the footing assembly. In the present described embodiment, as the torso assembly 14 is rotated around the footing assembly, as seen in FIGS. 2A-2B, the footing pinion gear 98 drives the rack gear 92 back and forth across the torso assembly along a track 104 in the bracket element 52 of the torso pinion gear 42, as seen in FIG. 5.

In the present described embodiment, a second arm appendage 106, as seen in FIGS. 1A-1C, is mounted on a second shoulder pin 108 in the torso assembly, as seen in FIG. 2A, for coupling the second arm appendage to freely move about the shoulder pin swinging the arm appendage 106 out away from the torso assembly when the torso assembly is moved in relation to the footing assembly. A second abutment surface 94b of the bracket element 94 (and integral rack gear 92) drives the second arm appendage 106 out to an elevated punching position. As seen in FIGS. 1B & 1C, the first arm appendage 88 is swung out to an elevated punching position as the torso assembly is moved to a first position, as seen in FIG. 1B, and the second arm appendage is swung out to an elevated punching position as the torso assembly is moved to a second position, as seen in FIG. 1C.

Rapidly alternating the activation of the two actuators 26 and 70 will rapidly display a punching action back and forth from each arm appendage 88 and 106. Two or more users can game play with each other opposing two or more toy action FIG. 10 in a fighting scene driven manually by each user's fingers with each user rapidly depressing the first and second actuators, 26 and 70, respectively, in an alternating fashion to display a punching action in each toy FIG. 10 as the users game play to fight each other's opposing toy FIG. 10.

The toy FIG. 10 can be secured to a variety of controllers, as seen in FIGS. 6,18,19 & 21, for driving action movements in the toy FIG. 10. The controllers drive the same action movements in the toy figure as the user drives manually with the user's fingers by activating the first and/or second actuators through the actuator access openings of the footing assembly. The controllers generally include a handle and a platform assembly for receiving the footing assembly. The platform assembly further includes a plate for supporting the received footing assembly, a binding assembly for coupling/securing the footing assembly to the platform assembly/plate and a manual control element disposed adjacent the platform assembly including an actuating point for driving the actuator of the footing assembly at the actuator access openings of the footing assembly.

Figure 6C:
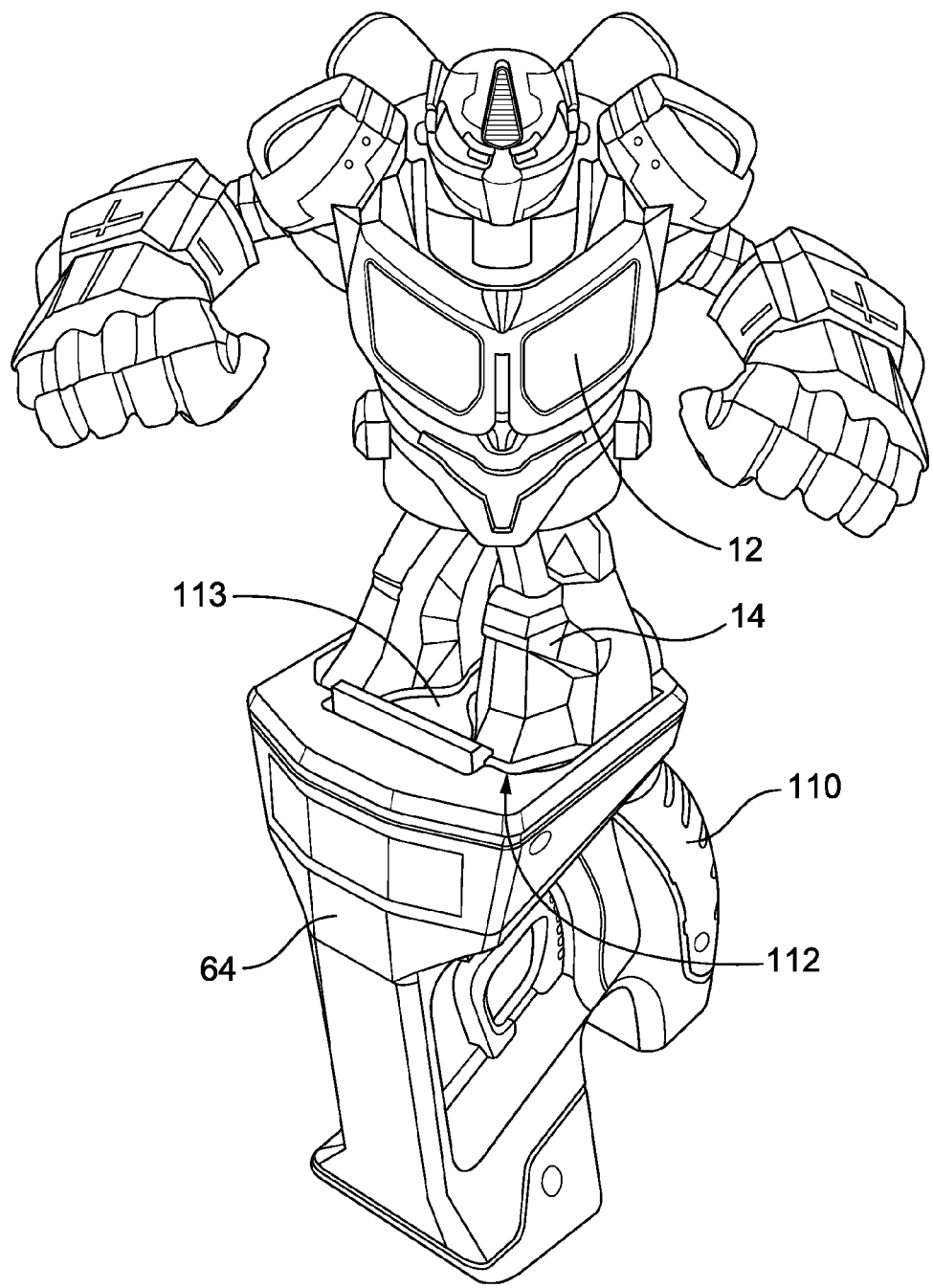
FIG. 6C illustrates the torso assembly moved to a second position in relation to the footing assembly.
Figures 7A, 7B:
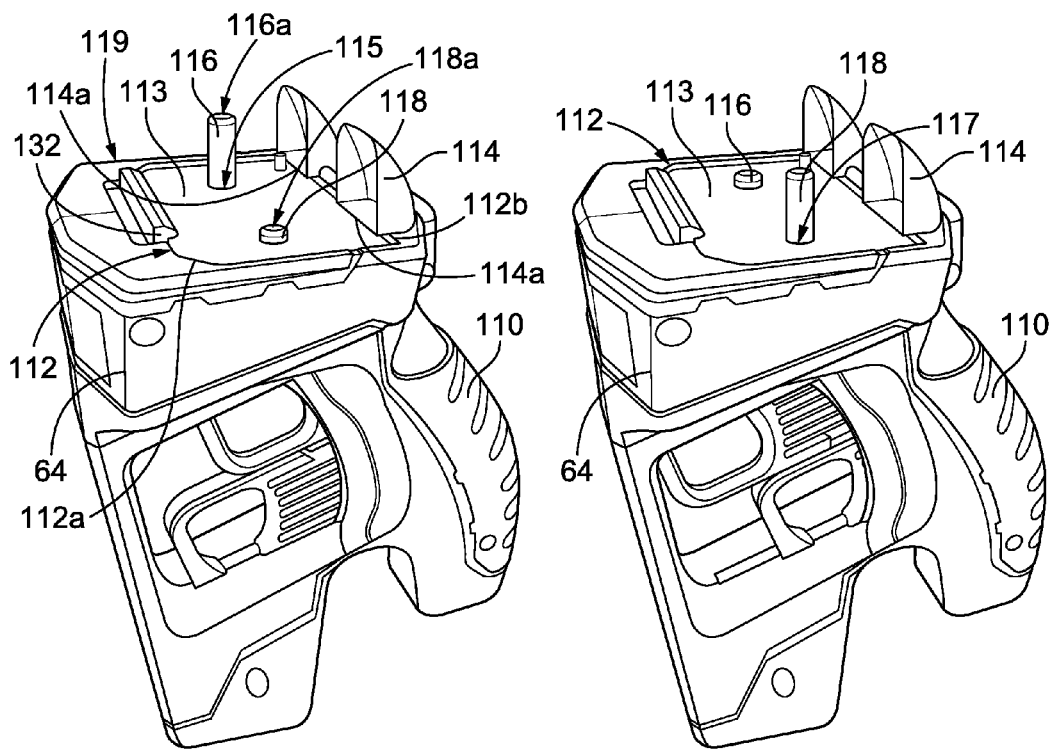

In the present described embodiment, the toy FIG. 10, as seen in FIGS. 6A-6C, is secured to a piston driven controller 64 for driving movement of the torso assembly in relation to the footing assembly. The piston driven controller 64 includes a handle 110 for gripping the controller by the user and a platform assembly 112 at a first end of the handle 110 for receiving the footing assembly 14 of the toy 10. The received footing assembly includes one or more binding tabs 111 and an actuator with a working surface accessible through an actuator access opening. The piston driven controller further includes a manual control element disposed at the handle and includes an actuating point 116a and/or 118a, as seen in FIG. 7A, extending into contact with the working surface of the actuator of the footing assembly at the actuator access opening. The manual control element drives movement of the toy figure through its footing assembly.

In the present described embodiment, the platform assembly 112 has a first end 112a and a second end 112b and incorporates a plate 113 between first and second ends for supporting the received footing assembly. The plate 113, includes a through hole 115 and the manual control element includes a piston 116 at the through hole which is driven to extend at the through hole within the received footing assembly at the actuator access opening and into contact with the working surface of the actuator of the footing assembly for activating the toy. The piston 116 moves between an extending position, as seen in FIG. 7A, and a retracting position, as seen in FIG. 7B, within the footing assembly for driving the actuator at the working surface when the piston is extending for driving movement of the torso assembly in relation to the footing assembly.

As described above, the footing assembly includes one or more actuators with each actuator including a first and second working surface, as seen in FIG. 4. The piston driven controller 64 drives the torso assembly 12 in relation to the footing assembly 14, at the second working surface between the first position, as seen in FIG. 6B and the second position, as seen in FIG. 6C. Extending the piston 116 within the footing assembly 12 will access the actuator 70 through the underside opening 86 and drive the actuator 70 at the second working surface 74 through the underside opening of the footing assembly, as seen in FIG. 4, driving movement of the torso assembly in relation to the footing assembly to the first position, as seen in FIG. 6B.

Likewise, a second piston 118 penetrates a second through hole 117 in the platform assembly 112, more specifically in the plate 113, for piston movement within the footing assembly between an extending position, as seen in FIG. 7B, and a retracting position, as seen in FIG. 7A. Extending the second piston 118 within the footing assembly drives the actuator 26 at the second working surface 62 through the underside opening, as seen in FIG. 4, driving movement of the torso assembly in relation to the footing assembly to the second position, as seen in FIG. 6C.

Figures 8A, 8B, 8C:
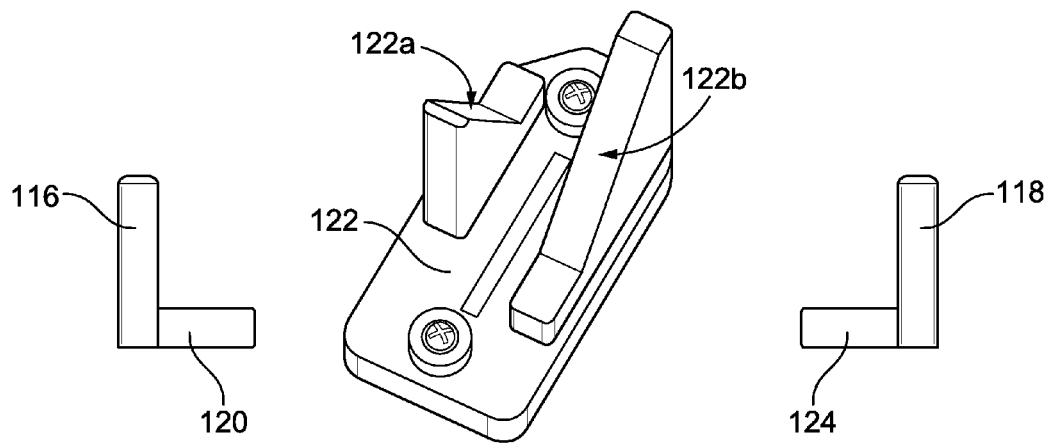
FIG. 8A is an elevational view of the first piston and follower; and 8B is a perspective view of a cam assembly illustrating first and second ramped cam surfaces.
FIG. 8C is an elevational view of the second piston and follower.

The manual control element further includes a cam follower 120 is coupled to an end of the piston 116, as seen in FIG. 8A. The manual control element also includes a cam assembly 122, as seen in FIG. 8B, including a ramped cam surface 122a that is in mechanical communication with, and drives the cam follower 120. Likewise a second cam follower 124 is coupled to an end of the second piston 118, as seen in FIG. 8C. The cam assembly 122 further includes a second ramped cam surface 122b that is in mechanical communication with, and drives, the second cam follower 124. In the present described embodiment, the cam follower 120 is integral with piston 116 and the second cam follower 124 is integral with second piston 118.

The second ramped cam surface 122b at the cam assembly 122 is positioned adjacent the first cam surface 122a and angled in a direction opposite the first ramped cam surface, as seen in FIG. 8B. The opposite angled direction of each of the two cam surfaces, 122a and 122b, provides a ramped structure to alternately extend and retract pistons 116 and 118, as the piston followers 120 and 124 ride along the ramped cam surfaces 122a and 122b, respectively. As the cam assembly 122 is shifted laterally back and forth, the ramped cam surfaces, 122a and 122b, cooperate to repeatedly extend piston 116 and allow piston 118 to retract, and then extend piston 118 and allow piston 116 to retract.

Figures 9A, 9B:
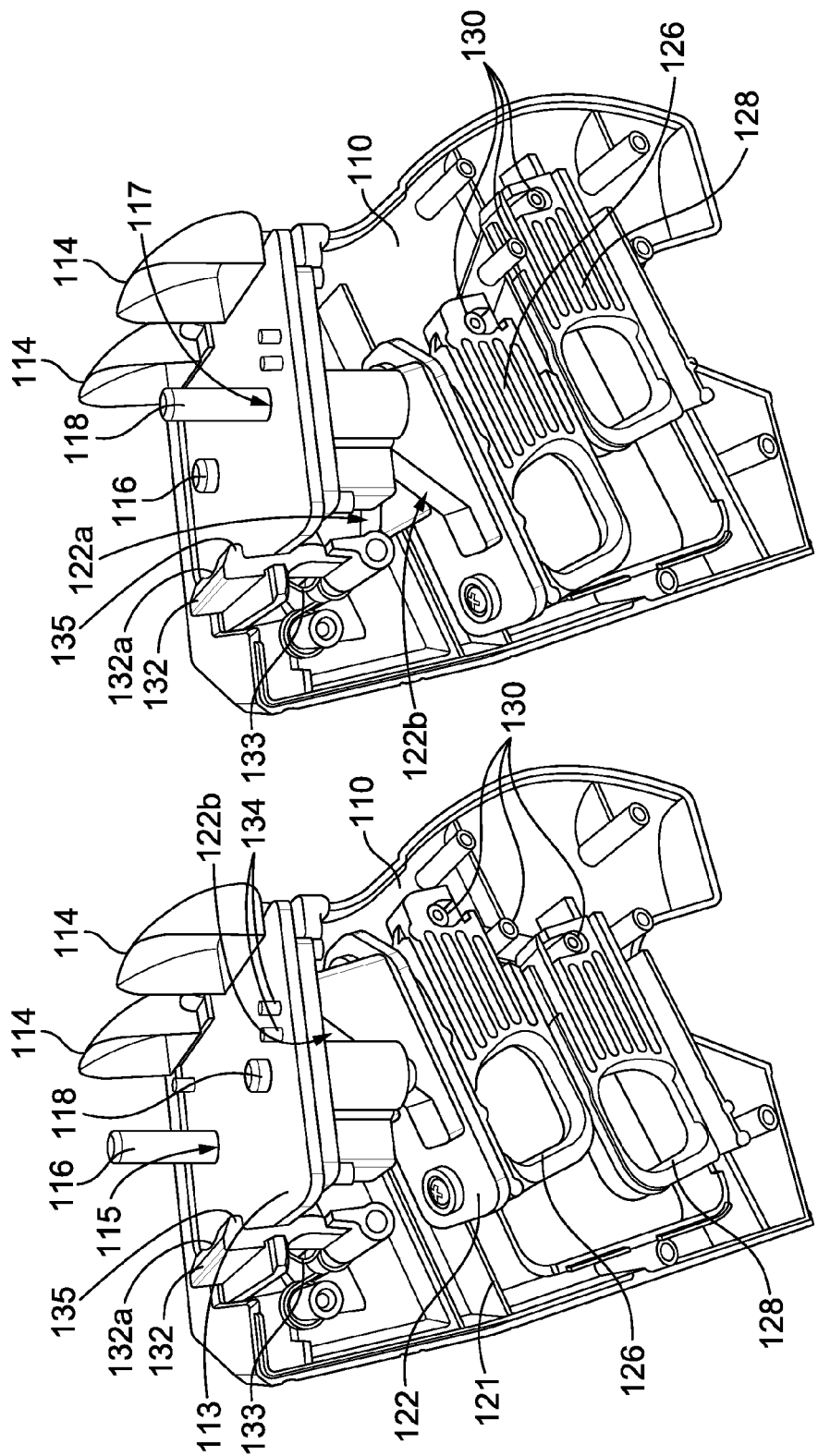

The manual control element further includes a trigger element 126 coupled to the cam assembly 122, as seen in FIGS. 9A and 9B, for driving or shifting the cam assembly 122 laterally back and forth along a track 121 in the controller. The trigger element is coupled to the cam assembly for driving the cam follower along the cam surface and the coupled piston to extend at the through hole with the piston actuating the toy figure through its footing assembly.

In use, the trigger element 126 is pulled to a first position, as seen in FIG. 9A, generally laterally toward the handle 110 of the controller 64, shifting the cam assembly to contact cam follower 120, as seen in FIG. 8A, and move cam follower 120 along cam surface 122a, extending coupled piston 116 at the through hole 115. The piston 116 is extended into the received footing assembly at the underside opening 86 and into contact with the second working surface 74 of the actuator 70 for activating the toy 10 and moving to the torso assembly 12 in relation to the footing assembly 14 to the first position, as seen in FIG. 6B.

A second trigger element 128 is linked to the first trigger element 126 with a toggle linkage 130, coupling first and second trigger elements together and toggling them back and forth opposite each other. As the second trigger element 128 is pulled toward the handle 110, as seen in FIG. 9B, generally laterally toward the handle 110 of the controller 64, the first trigger element 126 is shifted away from the handle to a second position with coupled cam assembly 122 driven in a direction away from the handle shifting the cam assembly 122 to contact cam follower 124, as seen in FIG. 8C, and move cam follower 124 along cam surface 122b, extending coupled piston 118 at the through hole 117. The piston 118 is extended into the received footing assembly, at the underside opening 36 and into contact with the second working surface 62 of the actuator 26 for activating the toy 10 and moving to the torso assembly 12 in relation to the footing assembly 14 to the second position, as seen in FIG. 6C.

Alternately pulling each of the first and second trigger elements, will cooperatively drive the cam assembly laterally back and forth and drive the first and second pistons to alternately extend (up and down) through the through holes of the platform assembly and into the footing assembly, alternately activating each of the first and second actuators at their second working surfaces driving the torso assembly repeatedly between first and second positions. The unique structure of the dual action actuator and its accessibility from two separate openings in the footing assembly provides the user with two different and distinct mechanisms for driving the same action movements in the toy FIG. 10.

A binding assembly 119 is disposed adjacent the platform assembly and includes a tension clip 132 coupled at the first end 112a of the platform assembly. The tension clip 132 extends beyond the plate 113 for capturing at least one of the one or more binding tabs 111 between the tension clip and the plate. The tension clip exerts a downward force on the binding tabs coupling the received footing assembly to the platform assembly.

In the present described embodiment, the tension clip includes a spring biased clip 132 in mechanical communication with the platform assembly 112 for securing the received footing assembly 14 to the platform, as seen in FIGS. 6A and 7A. Spring 133 biases the tension clip 132 toward the plate 113 exerting forces on the clip to pull the clip toward the plate. The tension clip captures one or more binding tabs 111 at the footing assembly 14, as seen in FIG. 6A, and secures the tabs/footing assembly to the plate 113 of the controller so that even fast movements of the torso assembly back and forth between first and second positions simulating a quick punching action movement will not break the footing 14 free from the platform assembly.

Figure 6D:
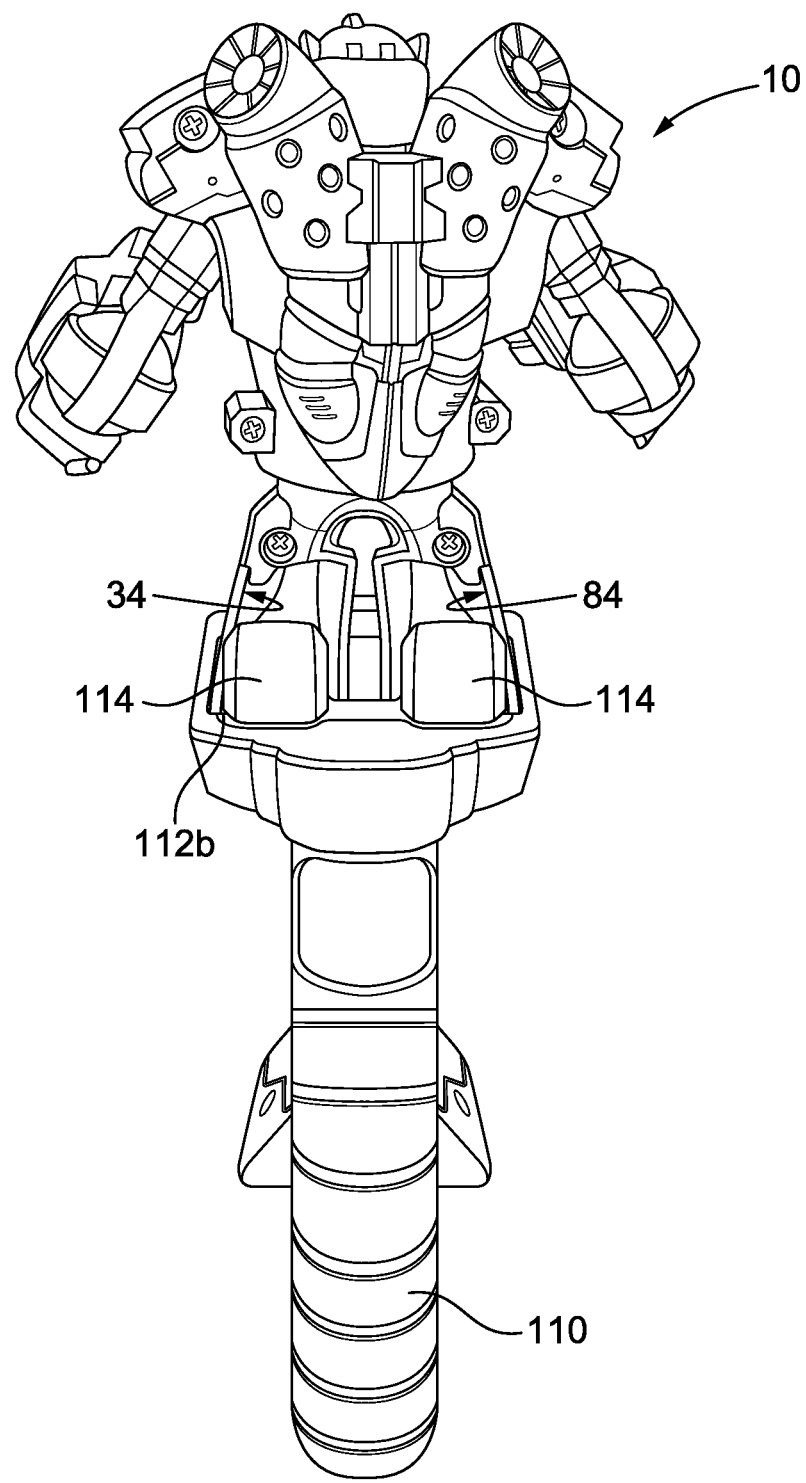
FIG. 6D illustrating a shroud element at the platform denying a user manual access to the elevational opening when the footing assembly is secured to the platform of the piston driven controller.

Additionally, one or more shroud barriers 114, as seen in FIGS. 6D & 9, are in communication with the platform assembly 112 adjacent the received footing assembly for denying access to the elevational outer opening 34 of the footing assembly when the controller is secured to the footing assembly, as seen in FIG. 6D. The controller 64 activates one or both actuators 26 and 70 through one or both of the underside openings 36 and 86 of the footing assembly 14, and the shroud barriers safely keep the user's fingers from accessing one or both of the elevational openings 34 and 84 as the controller rapidly moves one or more of the actuators 26 and 70 up and down as they are activated.

In use, triggers 126 and 128 can rapidly alternate the activation of the two actuators 26 and 70 to rapidly display a punching action back and forth from each arm appendage 88 and 106. Two or more users can game play with each other opposing two or more toy action FIG. 10 in a fighting scene driven by the piston controller 64 mounted to each toy FIG. 10. Each user alternately pulls on triggers 126 and 128 of their respective controllers 64 in a rapid fashion to display a punching action in each toy FIG. 10 as each user fights the other's opposing toy FIG. 10.

Additionally, in connection with the various described embodiments, the controller 64 includes a plurality of switches 134 at the platform 112, as seen in FIGS. 9A-9B, and electronics information processing & a sound generating device operable with the switches 134 for producing a respective sound corresponding to each respective footing assembly/toy figure character received at the platform. Toy figure characters are accordingly encoded to be identified through switch 134 depressions on the controller 64. The identity of each toy figure character is determined using a microprocessor or microcontroller, operable with the controller 64, for processing information and executing functions as discussed further below. Switches 134 are either open or closed based on the openings on each character's footing assembly as determined by respective through holes or openings/character markers 136, as seen in FIG. 3.

One or both plates 24 and 76 of the footing assembly 14 includes selectively located through hole character markers 136 for identifying the footing assembly of each particular character represented in each toy figure, as each toy figure is received on the controller 64. It is also contemplated that various alternative controller embodiments, as discussed below, also include switches 134 (and electronics information processing and sound generating device) cooperating with the through hole character markers 136 of each footing assembly embodiment for identifying the footing assembly/toy character received onto each of the various alternative controller embodiments.

Each character represented in the toy figures are assigned a designated number, e.g., 1 through 20, which corresponds to an assigned binary code to numerically represent each character for binary code switch pattern determinations. This type identifying determination is exemplified and disclosed in U.S. Pat. No. 5,906,369 to Brennan, et al. for "Electronic matching game apparatus including sound generating means and method of game play using the same" issued May 25, 1999, assigned to Applicant's Assignee. When a footing assembly of a particular toy figure character is clipped onto the controller platform, the through hole character markers 136 will align with some, all, or none of the controller switches 134 allowing those aligned switches to pop through the character marker through holes 136. The non-aligned switches 134 will identify the secured footing assembly and generate a unique sound and other functions to correspond to, and readily identify, particular toy figure, e.g., Prowl (1, 00001); Bumblebee (2, 00010); Barricade (3, 00011); Starscream (4, 00100); Optimus (5, 00101); Megatron (6, 00110); Bumblebee (7, 00111); Hot Rod (8, 01000); Knockout (9, 01001); Barricade (10, 01010); Grimlock (11, 01011); Optimus (12, 01100); Soundwave (13, 01101); Starscream (14, 01110); Wheel Jack (15, 01111); Lockdown (16, 10000); Megatron (17, 10001); Ironhide (18, 10010); Optimus (19, 10011); Grimlock (20, 10100). Other various switch and through hole arrangements are also contemplated to identify each toy figure from its' footing assembly.

The character and controller 64 combinations may be used with at least one or a plurality of infrared or visible light emitting diodes (LEDs) for use with the electronics information processing for various interactive computer based game control functions. These types of game control functions are exemplified and disclosed in U.S. Pat. No. 5,672,108 to Lam, et al. for "Electronic game with separate emitter" issued Sep. 30, 1997, assigned to Applicant's Assignee. When a footing assembly of a particular toy figure character is clipped onto the controller platform, the controller 64 emitter unit emits light or beams of electromagnetic radiation of particular wavelengths using LEDs. A target unit of a computer based game and display, tablet, iPad™ or the like may be configured with one or more sensors for measuring the amount of electromagnetic or light illumination or digital signaling. The target unit of a computer based game accordingly controls the flow of the game and receives input signals from controller 64 which affect the game. The emitter unit of the controller 64 has the triggers 126 and 128 for fighting actions, which alternatively may be used in connection with shooting at targets appearing on the display. Further types of game play may be incorporated where the player attempts to battle robots or vehicles with shields or various control functions.

Battling action game play can be expanded beyond two or more users battling each other's toy FIG. 10 with punching actions driven by each user's fingers or each user's controller, to battling action game play utilizing the controller 64 to battle virtual robots, etc. A computer or other smart device displaying virtual combatants communicates with the controller 64 allowing users to play various interactive computer based games with their toy FIG. 10 mounted on controllers 64.

In an alternative embodiment, as seen in alternative toy FIG. 210 in FIGS. 10-14, the torso assembly 212 moves in relation to the footing assembly 214, pivoting at an angle with respect to the footing assembly 214, rather than rotating around the footing assembly, as in other described embodiments. The torso assembly 212 of the present described alternative embodiment, does not overlap the footing assembly or couple to a collar element, but rather abuts the footing assembly at a generally diagonal plane A-A, as seen in FIG. 10A, and pivots along the diagonal plane A-A when moving with respect to the footing assembly. The plane line A-A is generally diagonal to the footing assembly 214 when the footing assembly is stood upright resting on surface 219.

Figure 11A:
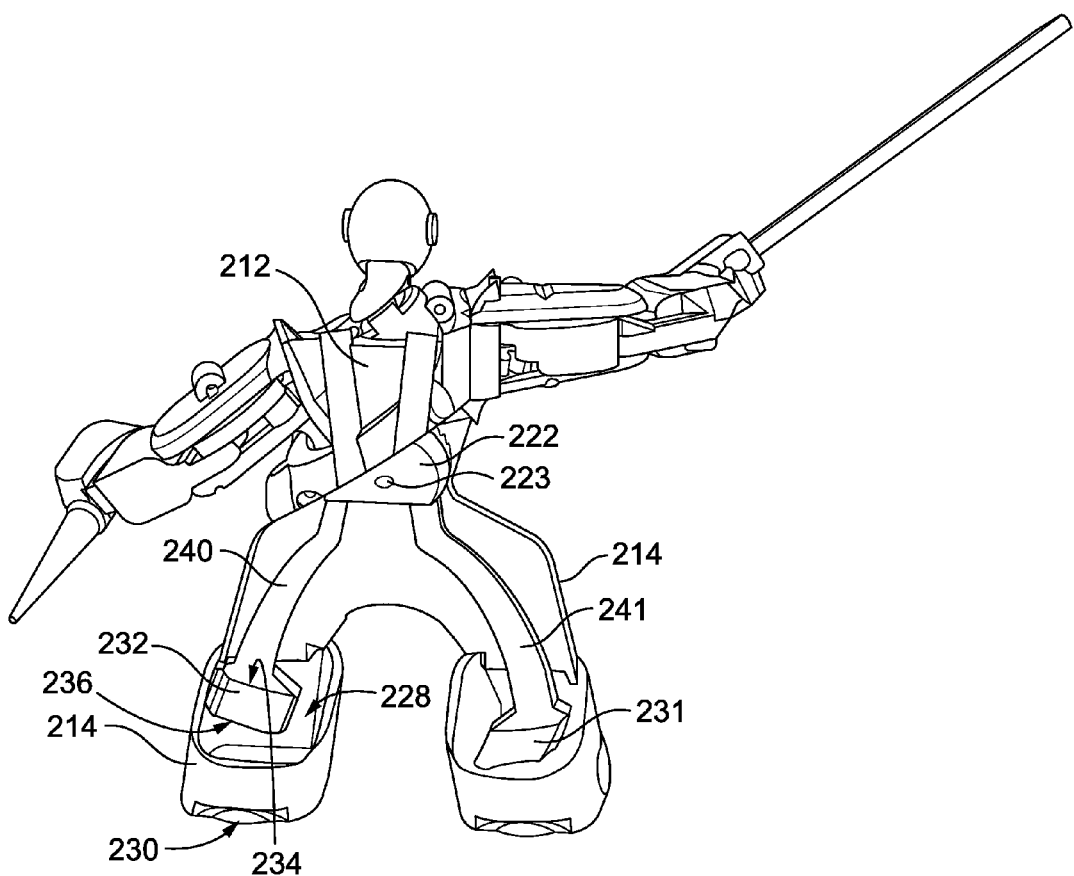
Figure 11B:
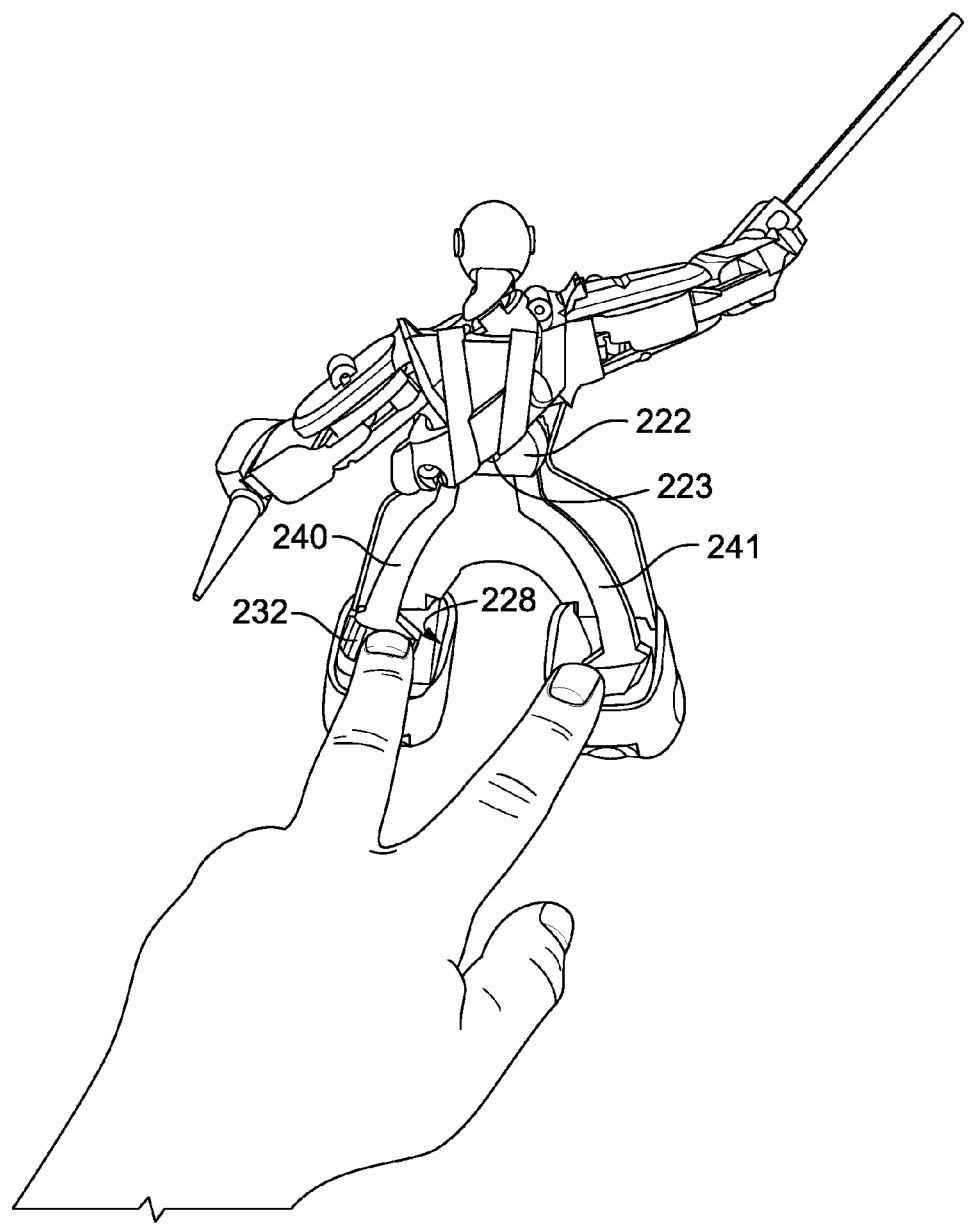
FIG. 11B illustrates manual activation of the actuator by a user's fingers pivoting the torso assembly in relation to the footing assembly along diagonal plane A-A.

The torso assembly 212 is generally manufactured from a hard durable plastic material and crafted to look like a ninja warrior holding a weapon in each fist. The footing assembly 214 is in mechanical communication with the torso assembly 212 which is also manufactured from a hard durable plastic material and crafted to look like the feet of a ninja warrior. As with other presently described embodiments, the footing assembly 214 has an elevational outer opening 228, an underside opening 230, and an actuator 232 disposed within the footing assembly, as seen in FIGS. 11A & 11B. The actuator 232 has a first working surface 234 accessible from the elevational outer opening and a second working surface 236 accessible from the underside opening for actuating a gear assembly 238 and driving movement of the torso assembly in relation to the footing assembly, as seen in FIG. 10B, both manually with the user's fingers, as seen in FIG. 11B, and by a piston driven controller secured to the footing assembly, as described above.

The gear assembly 238 of the presently described alternative embodiment includes an arcuate rack gear 222 gear mounted on a first axle 223 and linked to the actuator 232 by a linkage 240, as seen in FIG. 11B. The linkage 240 extends from the torso assembly at the arcuate rack gear with a distal end of the linkage extending into the footing assembly.

Similar to the described embodiment of toy FIG. 10, a second linkage 241, matching linkage 240 cooperates to toggle the arcuate rack 222 back and forth when actuating a second actuator 231 (which matches the first actuator 232 in structure and function) is activated. The footing assembly 214 also includes a second elevational outer opening providing access to a first working surface of the second actuator 231 and a second underside opening providing access to a second working surface of the second actuator 231, similar to the structure described above for the first elevational and underside openings of the footing assembly 214.

A torso pinion gear 216, of the presently described alternative embodiment, is mounted on a second axle 225, which is generally on a diagonal with respect to the first axle 223. The torso pinion gear 216 is within the torso assembly and in mechanical communication with the arcuate rack gear 222 for driving movement of the torso assembly in relation to the footing assembly.

The torso pinion gear 216 couples directly to the torso assembly 212, and pivots the torso assembly 212 in relation to the footing assembly 214, as seen in FIG. 10B. The torso pinion gear 216 of the presently described alternative embodiment is generally circular and includes an attachment portion 218 disposed at a either a point along the circular periphery or at a first side 216a of the pinion gear 216, for attaching the torso pinion gear 216 to the torso assembly 212, as seen in FIG. 12.

Figure 12:
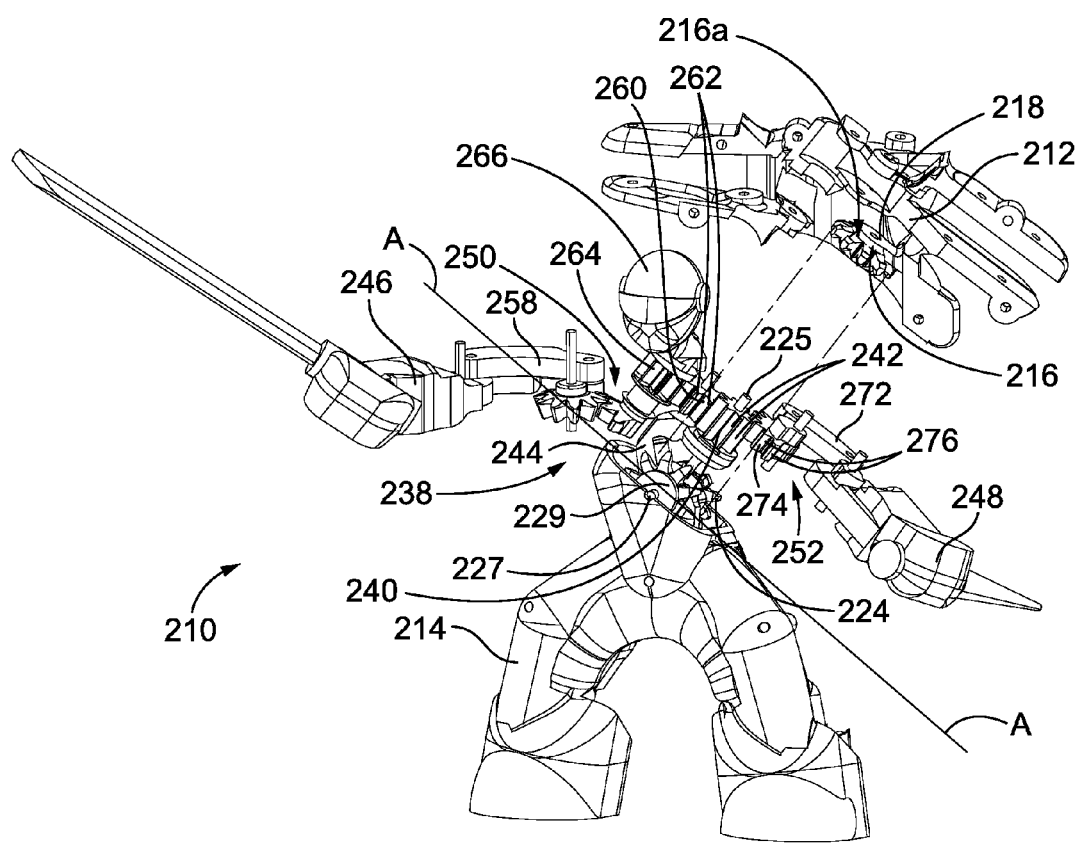
FIG. 12 is a perspective view of a gear mechanism of the alternative embodiment with a portion of the torso assembly exploded from the toy figure illustrating a torso pinion gear connected to the torso assembly and a footing pinion gear in mechanical communication with pinion gear mechanisms in one or more arm appendages.

The torso pinion gear 216, of the presently described alternative embodiment, communicates with the arcuate rack gear 222 through a first pinion gear 224 which includes gear teeth for meshing with gear teeth of both the arcuate rack gear 222 and the torso pinion gear 216, as seen in FIG. 12. The first pinion gear 224 is mounted on a third axle 227 which is adjacent, and generally parallel, to the first axle 223 which mounts the arcuate rack gear. A second pinion gear 229, generally matching the first pinion gear 224, is also mounted on the third axle 227. In use, the first and second pinion gears, 224 & 229 respectively, sandwich torso pinion gear 216 between them and transfer the rotational drive of the arcuate rack gear 222 to the torso pinion gear 216, as the first pinion gear 224 is rotated by the arcuate rack gear 222. The second pinion gear 226 helps support movement of the torso pinion gear 216 as the first pinion gear 224 is rotated.

In the present described alternative embodiment, a footing pinion gear 240 is mounted on the second axle 225 adjacent the torso pinion gear 216, as seen in FIG. 12. The footing pinion gear 240 is positioned within the torso assembly, but linked with the footing assembly, similar to the other described embodiment above. The footing pinion gear 240 includes gear teeth 242 that mesh with one or more pinion gears of one or more pinion gear mechanisms for driving movement of one or more arm appendages and a head element, etc. when the torso assembly 212 is moved in relation to the footing assembly 214. In the present alternative embodiment, as seen FIGS. 12-14, the alternative toy FIG. 210 has a first and second arm appendage, 246 and 248, respectively, in the torso assembly 212 and in mechanical engagement with a first and second pinion gear mechanism 250 and 252, respectively.

A footing extension bracket 244 links the footing pinion gear 240 to the footing assembly 214 and supports the footing pinion gear at the second axle 225. The footing extension bracket 224 elevates the footing pinion gear within the torso assembly to a position suitable for communicating with the pinion gear mechanisms 250 and 252 for movement of the arm appendages 246 and 248. The footing extension bracket 224 also positions the footing pinion gear 240 away from interference with the rotating torso pinion gear 216 which sits on the same second axle 225 adjacent the footing pinion gear 240.

Figure 13:
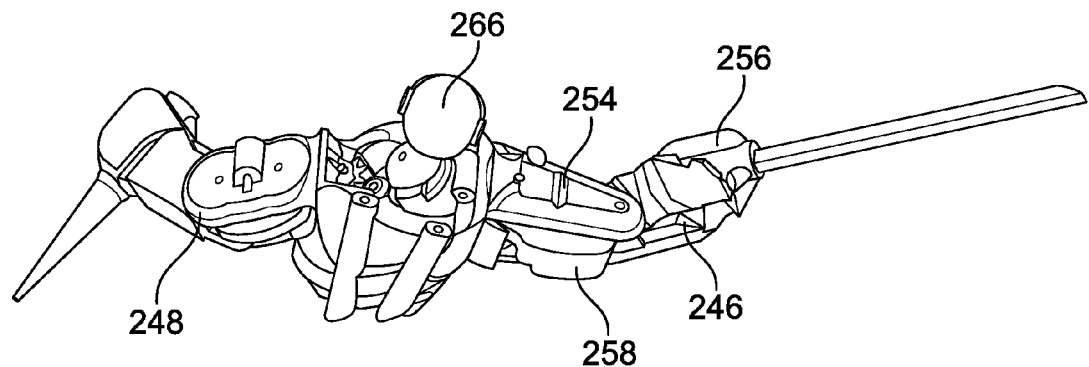
FIG. 13 is a perspective view of an arm appendage and figure head illustrating an arm and head gear linkage contacting the footing pinion gear to move the arm appendage and head when the torso assembly moves in relation to the footing assembly.

In the present described alternative embodiment, the first arm appendage 246 includes a first arm portion 254 coupled to the torso assembly 212 and containing at least a portion of the first pinion gear mechanism 250, as seen in FIGS. 12 & 13. The first arm portion 254 is integral with the torso assembly and connects to a second arm portion 256 through a linkage 258. A lead pinion gear 260, of the first pinion gear mechanism 250, mechanically communicates with the footing pinion gear 240 of which it is adjacent. The lead pinion gear 260 is the first gear in the train of gears that make up the first pinion gear mechanisms 250, and includes gear teeth 262 which mesh with the gear teeth 242 of the footing pinion gear 240.

In use, the torso pinion gear 216 is rotated around axle 225 and moves connected torso assembly 212 also about axle 225 and in relation the footing assembly 214. Additionally, integral first arm portion 254 of the first arm appendage moves about axle 225 as it is pivoted with integral torso assembly 212. As the torso assembly and integral first arm portion are moved, the lead pinion gear 260 is rotated on the footing pinion gear 240. Rotation of the lead pinion gear drives rotation of the entire first pinion gear mechanism 250 and moves second arm portion 256 through linkage 258 exhibiting a striking action with the first arm appendage 246, as seen in FIG. 10B.

In the present described alternative embodiment, a head gear 264 is adjacent the lead gear 260 and securely connects to a head element 266. The head gear 264 is a second gear of the first pinion gear mechanism 250 and translates the rotational drive of the lead gear 260 to the remaining gears of the first pinion gear mechanism 250, and also pivots the head element 266 simultaneously with the striking action of the first arm appendage 246, as seen in FIG. 10B.

Figure 14:
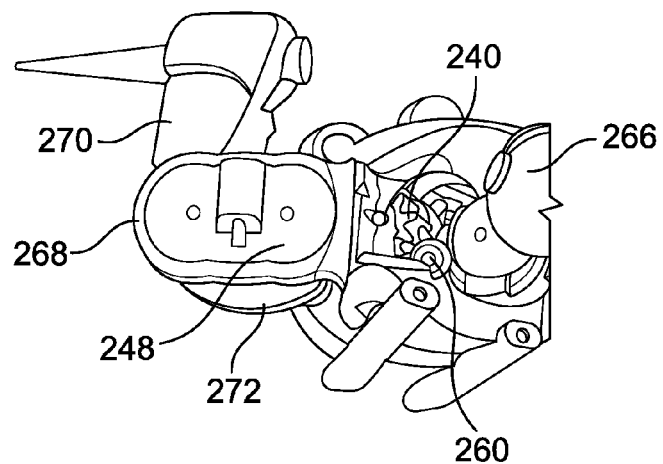
FIG. 14 is a perspective view of a second arm appendage and second arm gear linkage also contacting the footing pinion gear to move the second arm appendage when the torso assembly moves in relation to the footing assembly.

Additionally, in the present described alternative embodiment, the second arm appendage 248 includes a first arm portion 268 coupled to the torso assembly 212 and containing at least a portion of the second pinion gear mechanism 252, as seen in FIGS. 12 & 14. The first arm portion 268 is integral with the torso assembly and connects to a second arm portion 270 through a linkage 272. A second lead pinion gear 274 mechanically communicates with the footing pinion gear 240 of which it is adjacent, and the second lead pinion gear 274 includes gear teeth 276 which mesh with the gear teeth 242 of the footing pinion gear 240.

As the torso pinion gear 216 is rotated around axle 225, integral first arm portion 268 of the second arm appendage 248 moves with the torso assembly 212. As the torso assembly and integral first arm portion 268 are moved, the second lead pinion gear 274 is rotated on the footing pinion gear 240. Rotation of the second lead pinion 274 gear drives rotation of the entire second pinion gear mechanism 252 and moves the second arm portion 270 through linkage 272 exhibiting a stabbing action with the second arm appendage 248, as in the present described alternative embodiment, as seen in FIG. 10B.

The simple yet unique structure of the first and second pinion gear mechanisms 250 and 252, respectively, rotated on the footing pinion gear 240 as the torso assembly is moved in relation to the footing assembly, provides for simultaneous action movements of first and second arm appendages and the head element in cooperation with torso assembly movement. It is also contemplated that additional gear mechanisms can also communicate with the footing pinion gear to drive cooperating movements of additional elements.

Additionally, movement of the torso assembly 212, as seen in FIG. 10B, is in a first direction to a first position. It is also contemplated that the torso assembly 212 can move in a second direction to a second position, similar to movement of the described embodiment above for toy FIG. 10.

Further alternative embodiments are described below as second, third and fourth alternative embodiments. The further alternative embodiments focus mainly on alternative appendage elements and their connection to the torso assembly through alternative mechanisms in mechanical communication with alternative footing gears and/or footing bracket or channel elements on which each appendage element is driven for movement in relation to the torso assembly as the torso assembly is moved in relation to the footing assembly.

Figure 15:
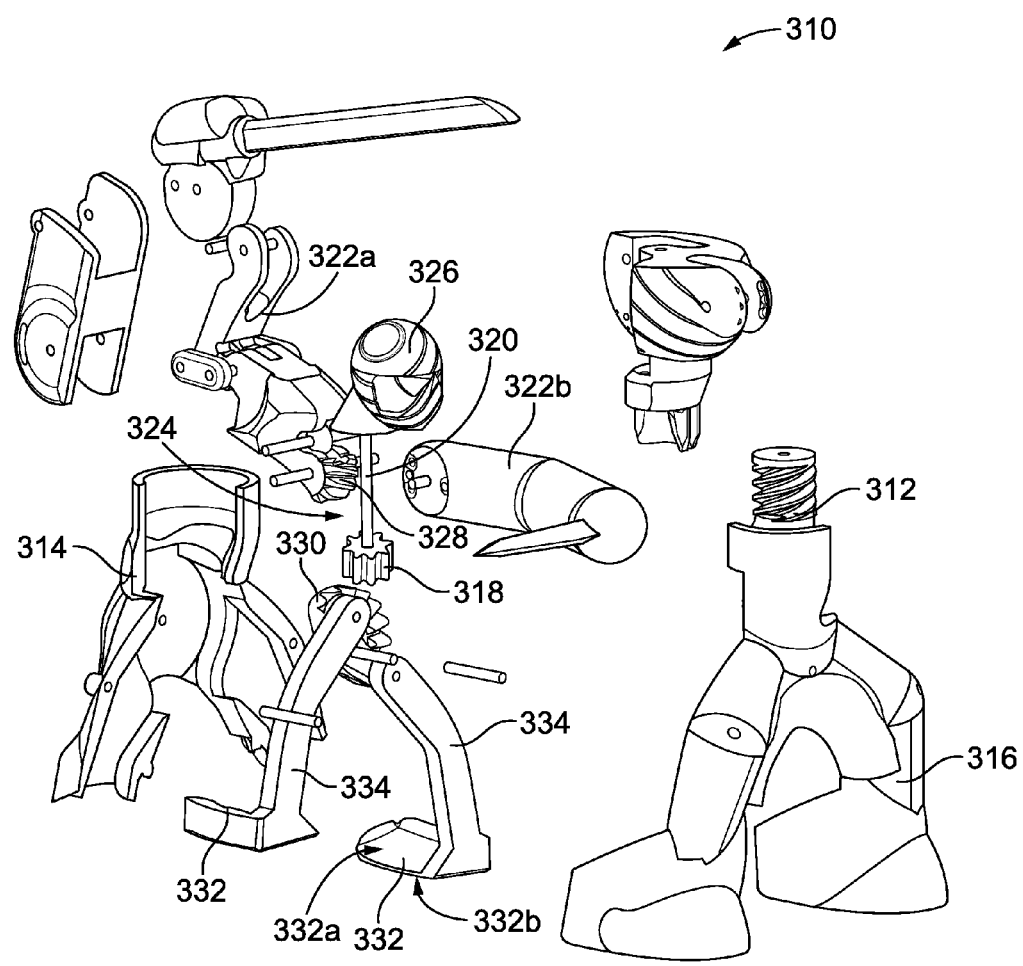
FIG. 15 is an exploded view of second alternative embodiment of the toy figure illustrating a footing worm/screw gear engaging one or more pinion gear mechanisms which drive movement of one or more arm appendages as the pinion gear mechanisms are rotated on the worm/screw gear.

In a second described alternative embodiment, as seen in FIG. 15, a modified footing worm gear or screw gear 312 replaces the footing pinion gear 240 as described in the first alternative embodiment in toy FIG. 210. Similar to the footing pinion gear 240, the footing worm or screw gear 312 is positioned within a torso assembly 314 and linked to a footing assembly 316. A torso gear 318 connects to the torso assembly 314 and drives movement of the torso assembly in relation to the footing assembly. The torso gear 318 is mounted on axle 320, and axle 320 also runs through the footing worm/screw gear 312. One or more arm appendages and/or a head element are coupled to the torso assembly 314 and/or linked through one or more gear mechanisms and/or linkages to the footing worm/screw gear 312.

In the present described second alternative embodiment, a first and second arm appendage, 322a & 322b, respectively, are connected to the torso assembly 314 for movement along with the torso assembly as the torso assembly is moved relative to the footing assembly. An appendage gear mechanism 324 couples first and second arm appendages, 322a & 322b, respectively, to the torso assembly, and the appendage gear mechanism 324 is in mechanical communication with the footing worm/screw gear 312. A head element 326 is mounted on axle 320 and is stationary.

In use, the torso gear 318 is rotated in a first direction moving the torso assembly in relation the footing assembly to a first position. Arm appendages 322a and 322b coupled to the torso assembly are moved along with the torso assembly rotating the appendage gear mechanism 324 on the footing worm/screw gear 312. A lead gear 328 of the appendage gear mechanism 324 is rotated up and down on the footing worm/screw gear 312 as the torso assembly is moved to the first position. Rotation of the lead gear 328 drives movement of the of the arm appendages 322a & 322b through the appendage gear mechanism 324 exhibiting a slicing action with arm appendage 322a and a stabbing action with appendage 322b, as seen in FIG. 15. Additionally, the torso gear 318 can be rotated in a second direction to move the torso assembly 314 to a second position and activate the appendage gear mechanism 324 to move the first and second arm appendages to a second position.

Similar to the second alternate embodiment, as seen in toy FIG. 210, the torso gear 318 is rotated by an arcuate rack gear 330 which is actuated by one or more actuators 332 positioned in the footing assembly and linked to the arcuate rack gear in the torso assembly through one or more linkages 334. The one or more actuators 332 are dual action employing a first working surface 332a accessible through one or more elevational openings of the footing assembly and a second working surface 332b accessible through one or more underside openings of the footing assembly for driving an action movement of the alternative toy FIG. 310 by both a user's fingers and a piston driven controller secured to the footing.

Figure 16A:
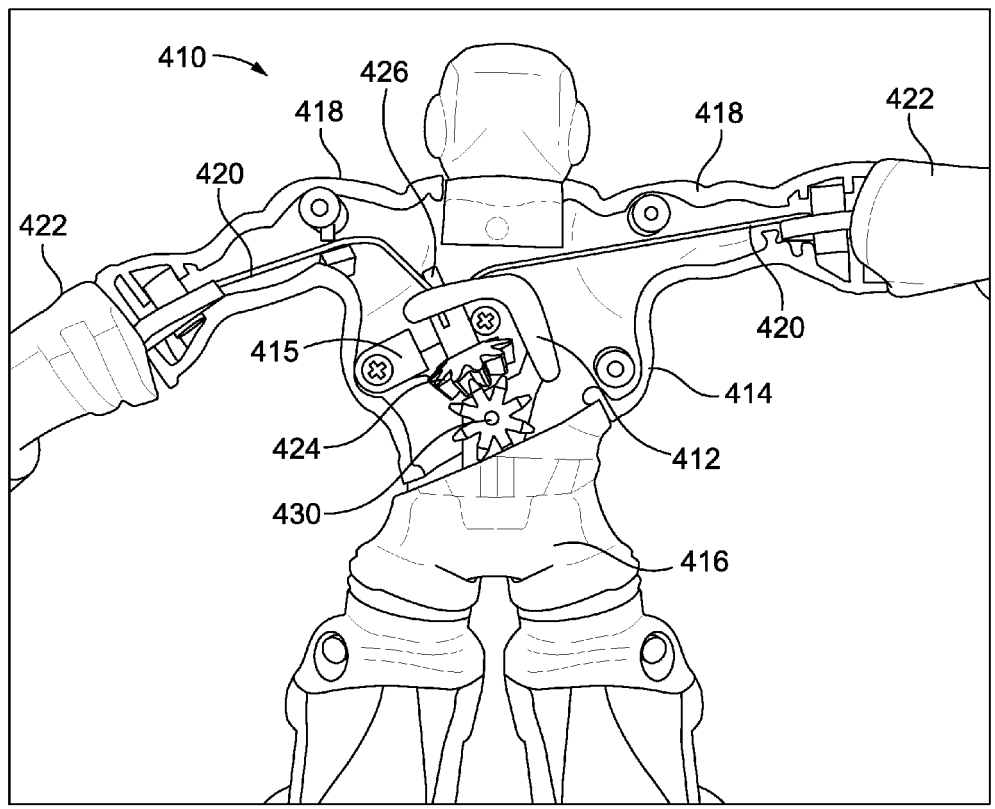
FIG. 16A is a perspective view of a third alternative embodiment of the toy figure illustrating wire linkages attaching arm appendages to a footing bracket which provides a fixed point in which a torso assembly is moved around when moved in relation to a footing assembly.
Figure 16B:
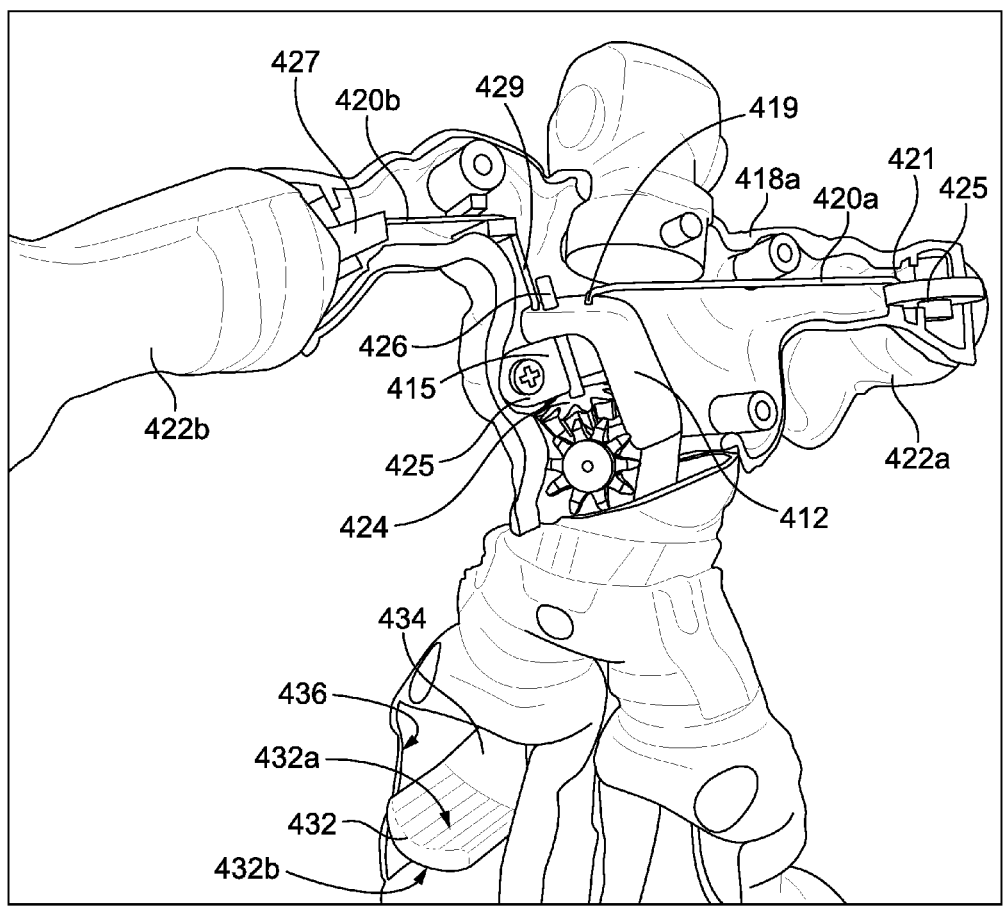
FIG. 16B illustrates the torso assembly moved to a first position flexing an arm appendage.

In a presently described third alternative embodiment, as seen in toy FIG. 410, the footing worm/screw gear 312 is replaced with a footing bracket 412 and pinion gear mechanisms for moving arm appendages are replaced with wire linkages. The footing bracket 412 is positioned within a torso assembly 414 and linked to a footing assembly 416, as seen in FIG. 16A-16B. One or more shoulder elements 418 are fixed to the torso assembly 414 and a wire linkage 420 (in place of pinion gear mechanisms) extends from the footing bracket 412, through the one or more shoulder elements 418 to an arm appendages 422 extending from each shoulder 418. In the present described alternative embodiment, a torso gear 424 connects to the torso assembly 414 at bracket 415 and drives movement of the torso assembly in relation to the footing assembly, as seen in FIG. 16B. The torso gear 424 is mounted on axle 426, and axle 426 also runs through the footing bracket 412.

A first linkage 423 connects a first arm appendage 422a to a first shoulder element 418a, and a second linkage 427 connects the second arm appendage 422b to a second shoulder element 418b. Wire linkage 420a is coupled to footing bracket 412 and extends through the first shoulder 418a to the first linkage 423, and likewise, wire linkage 420b is coupled to the footing bracket 412 and extends through the second shoulder element 418b to the second linkage 427.

In use, the torso gear 424 is rotated while connected to the torso assembly 414 moving the torso assembly in relation the footing assembly and also moving the integral shoulder elements 418a and 418b along with the torso assembly. Rotation of the torso assembly drives movement of the one or more arm appendages 422a and 422b, through the wire linkages 420a and 420b. The footing bracket 412 is fixed in relation to the footing assembly and provides a fixed point in which the torso assembly 414 and integral shoulder elements 418a and 418b rotate. As the torso assembly 414 is moved to a first position, as seen in FIG. 16b, wire linkage 420a is stationary at the fixed footing bracket 412 at a first wire end 419 and pulls on first linkage 423 at a second wire end 421, flexing the first arm appendage 422a.

The torso assembly 414 can also move in a second direction around the fixed footing bracket 412 to a second position. As the torso assembly 414 is moved to a second position wire linkage 420b is stationary at the fixed footing bracket at a first end 429 and pulls on second linkage 427 at a second wire end 431, flexing the second arm appendage 422b.

Similar to the second alternate embodiment, as seen in toy FIG. 210, the torso pinion gear 424 is rotated by an arcuate rack gear 428 through a first translating pinion gear 430. The arcuate rack gear 428 is actuated by one or more actuators 432 positioned in the footing assembly and linked to the arcuate rack gear in the torso assembly through one or more linkages 434. The one or more actuators are dual action employing a first working surface 432a accessible through an elevational opening 436 of the footing assembly and a second working surface accessible through an underside opening of the footing assembly for driving an action movement of the alternative toy FIG. 410 by both a user's fingers and a piston driven controller secured to the footing.

In a presently described fourth alternative embodiment, as seen in toy FIG. 510, the combined footing bracket 412 and wire linkage arrangement for flexing and extending arm appendages as the torso assembly is moved, as described in the third alternative embodiment toy FIG. 410, is replaced with a footing channel or track element 512 and appendage follower 514 which rides in a channel or track 516 of the footing channel or track element 512. The footing channel element 512 is positioned in a torso assembly 516 and linked to a footing assembly 518, as seen in FIGS. 17A & 17B. One or more arm appendages 519 are coupled to the torso assembly 516 and linked for movement through an appendage follower 514 to the footing channel element 512. A torso gear 526 is coupled to the torso assembly 516 and moves the torso assembly in relation to the footing assembly 518 driving movement of the one or more arm appendages 519 as the torso assembly is moved.

In the present described fourth alternative embodiment, a first arm portion 520 is coupled to the torso assembly 514 and a second arm portion 522 is coupled to the first arm portion 520. A wire linkage 524 connects first and second arm portions 520 & 522, respectively, to the appendage follower 514 for movement of the first and second arm portions when the torso assembly 516 is moved in relation to the footing assembly, as seen in FIGS. 17A & 17B.

In use, the torso gear 526 is rotated in a first direction to a first position, a seen in FIG. 17B, rotating around fixed footing channel element 512. Rotation of the torso assembly 526 moves the coupled first arm portion 520 to rotate with the torso assembly about the footing channel element 512 and drives the connected appendage follower 514 to travel in a channel 512a of the footing channel element 512. As the appendage follower 514 travels along the channel 512a, the channel follower 514 pulls on the wire linkage 524 moving the arm appendage 519 to a 90 degree angle with respect to the torso assembly 516.

The torso assembly 516 can also move in a second direction around the fixed footing channel element 512 to a second position. As the torso assembly 516 is moved to a second position, the appendage follower 514 travels along the channel 512a in the opposite direction and moves the arm appendage 519 in an opposite direction with respect to the torso assembly.

Figure 18B:
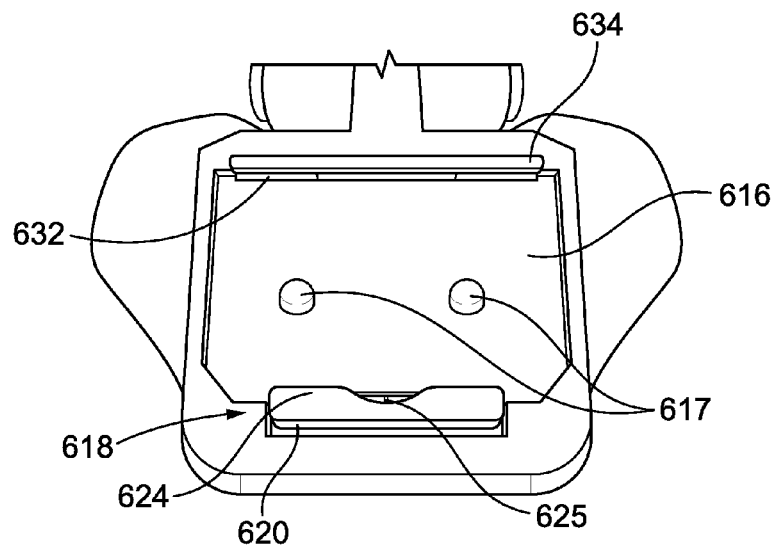
FIG. 18B illustrates a binding assembly at the platform assembly for securing the toy figure to the controller.

Further alternative controller embodiments are employed to activate the toy FIG. 10. First, second and third alternative controller embodiments 610, as seen in FIGS. 18A, 19B & 21, respectively, are generally manufactured from a hard durable plastic material which can be molded into various shapes and sizes, and in the present described embodiments, as seen in FIGS. 18A-18B, the controller is shaped to mimic a video game style controller, and as seen in FIGS. 19A-19B & 20, the controllers are shaped to mimic a light sabre. It is also contemplated that the alternative controllers 610 can be molded into a number of other suitable shapes and sizes including swords or other weapons.

The first, second and third alternative controller embodiments 610 employed to activate the toy FIG. 10, as seen in FIGS. 18A-18B, 19A-19B, & 21, include a handle 612, a platform assembly coupled to a first end 612a of the handle for receiving the footing assembly, and a binding assembly 618 coupling the footing assembly of the toy 10 to the platform assembly. The footing assembly 14 has one or more binding tabs 111 and an actuator 26 and/or 70 with a working surface accessible through an actuator access opening.

In the present described embodiment, the platform assembly 614 is integral with the handle 612 and includes a first end 612a and a second end 612b incorporating a plate 616 between first and second ends for supporting the received footing assembly 14. The plate is integral with handle 612 and recessed into the platform assembly 614 to define a perimeter wall generally around the plate's perimeter extending above the horizontal plane of the recessed plate.

The received footing assembly 14 is generally contained within the perimeter wall of the platform assembly 614 and secured to the plate through the binding assembly 618. The binding assembly 618 is disposed adjacent the platform assembly and includes a tension clip 620 coupled at the first end 612a of the platform assembly. The tension clip 620 is coupled to the controller at one end of the tension clip defining a tab portion 624, as seen in FIGS. 18B, 19B & 21, at a free end of the tension clip opposite the coupled end. (Tension clip 132, as seen in FIG. 9B, also illustrates a coupled end and a free end of the tension clip 132 defining a tab portion 135. The clip 132 has the structure and function the same as clip 620). The tab portion 624 extends beyond the plate 616 creating a gap between the clip and the plate for capturing at least one of the one or more binding tabs 111 coupling the received footing assembly to the platform assembly. A spring 625 biases the tension clip 620 toward the plate 616 and exerts constant forces on the clip to pull the clip toward the plate. The tab portion 624 of the tension clip 620 exerts a downward force on the binding tabs 111 coupling the received footing assembly to the platform assembly 614. The tension clip 620 maintains a secure coupling of the footing assembly 14 to the platform assembly at the first end 614a of the platform assembly.

Likewise, a spring 133 biases the tension clip 132 toward the plate 113 and exerts constant forces on the clip to pull the clip toward the plate. The tab portion 135 of the tension clip 132 exerts a downward force on the binding tabs 111 coupling the received footing assembly to the platform assembly 112. The tension clip 132 maintains a secure coupling of the footing assembly 14 to the platform assembly at the first end 112a of the platform assembly.

The binding assembly 618 further includes a stationary clip 632 affixed at the second end 614b of the platform assembly opposite the tension clip 132. In the present described embodiments, the stationary clip 632 is coupled to the controller at one end and defines a tab portion 634 at a free end opposite the coupled end, as seen in FIGS. 18B, 19B and 21. The tab portion 634 extends beyond the plate 616 creating a gap between the clip and the plate for capturing at least one of the one or more binding tabs 111 of the footing assembly 14 between the stationary clip 632 and the plate 616. The stationary clip secures the footing assembly 14 to the platform assembly at the second end 614b. The stationary clip together with the tension clip maintain a secure coupling between the footing assembly and the platform assembly in use. Even fast movements of the torso assembly, rapidly back and forth to simulate quick punching actions and side to side or upside down movements of the controllers, will not break the footing assembly 14 free from the platform assembly.

Alternatively, in the piston driven controller, the stationary clip 632 can include a defined edge 114a of the shroud barrier 114 creating a tab portion 114a that extends beyond the plate 113 and forming a gap between the tab portion 114a and the plate, as seen in FIG. 7A. The shroud barrier edge 114a can capture at least one of the one or more binding tabs 111 of the footing assembly 14 between the edge 114a and the plate 113 for securing the footing assembly to the platform assembly at an end opposite the tension clip 132. In the present described embodiment, binding tabs 111 disposed at the elevational openings 34 & 84, as seen in FIG. 2A, are captured by shroud barrier edge tabs 114a and held secure to plate 113 as seen in FIG. 6B. As with stationary clip 632, shroud barrier edge tabs 114a securely couple the footing assembly 14 to the platform assembly at the second end 112b of the platform assembly 112.

Releasing the toy FIG. 10 from any of the present described controller embodiments is accomplished by applying a manual force on the tension clip 132 or 620 to force the tension clip away from the plate 113 or 616, respectively, and against the biasing force of the biasing springs 133 or 625, respectively, to release the binding tabs 111 of the footing assembly 14 from between the tension clip and the plate, as seen in FIGS. 9A and 18A-18B respectively. Both tension clips 132 and 620 include a finger slot 132a and 620a, respectively, to facilitate the user forcing the tension clips 132 and 620 away from the plate against the spring biasing force to release the toy 10 from the controllers 64 and 610.

Additionally, one or more projections 617 at the plate 616 are included, as seen in FIGS. 18A-18B and 21, for mating with one or more apertures 85 of the footing assembly 14. The one or more projections 617 at the plate provide stabilizing points at the platform assembly to further maintain the received toy FIG. 10 stationary in use. As pivoting and rotational forces are exerted onto the received footing assembly 14, as the torso assembly is driven to rotate and pivot in relation to the footing assembly, the one or more projections mating with the one or more apertures 85 help the footing assembly remain stationary on the plate 616. Likewise, the pistons 116 and 118 act as projections at the plate 113 of the piston driven controller 64 mating with the underside openings 36 and 86 (apertures) as the pistons remain slightly extended (about ⅛th inch) above the plate 113 even when each piston is in the retracted position, as seen in FIGS. 9A & 9B.

The apertures 85 of the footing assembly for mating with the projections 617 are defined in plates 24 and 74 of the footing assembly, as seen in FIG. 3. The apertures 85 can overlap with the underside openings 36 and 86 as well as the switch apertures 136 as long as the apertures align to mate with protrusions 617. The underside openings 36 and 86 are the mating apertures for pistons 116 and 118, as described above.

The first and second alternative controller embodiments, as seen in FIGS. 18A-18B and 19A-19B further include a manual control element 630 disposed at the handle 612 adjacent the platform assembly and includes a first end disposed adjacent the platform and a second free end defining an actuating point 628 extending into contact with the working surface of the actuator at the actuator access opening of the received footing assembly. The actuating point activates the toy figure through its footing assembly driving movement of the torso assembly in relation to the footing assembly.

In the present described embodiment, as seen in FIGS. 18A and 19B, the manual control element includes one or more actuator arms 630 affixed to the controller at one end of the actuator arm and defining an actuating point 628 at a free end of the arm opposite the affixed end. The manual control element drives the actuator of the footing assembly at the elevational opening 84 of the footing assembly 14, as seen in FIG. 19B, with the actuating point 628 extending into contact with the working surface of the actuator of the footing assembly. The user extends one or both of the actuator arms 630 into contact with the actuators 26 and/or 70 at the elevational opening. Similar to manually depressing the first and second actuators, 26 and 70 respectively, at the elevational outer openings, as seen in FIGS. 1B-1C, the alternative controller embodiments drive the torso to alternately rotate back and forth with respect to the footing assembly in a quick punching and fast fighting action as the user manipulates the actuator arms 630 to alternately activate actuators 26 and 70 at the elevational openings 34 and 84.

The actuator arms 630 each include finger grip portions 630a, as seen in FIGS. 18A and 19B, for a secure grip on the actuator arms allowing the user to quickly extend each actuator arm alternately into contact with actuators 26 and 70 facilitating the rapid movement of the action toy 10. In the present described embodiment, the user contacts and depresses actuator arm 630 extending actuating point 628 to contact first working surface 60 of actuator 26 to move the torso assembly 12 with relation to the footing assembly toward a first position, as partially seen in FIG. 19B (rotation of torso assembly not seen in FIG. 19B). Alternately, the user contacts and depresses a second adjacent actuating arm 630 extending actuating point 628 to contact first working surface 72 of the second actuator 70 to move the torso assembly 12 with relation to the footing assembly toward a second opposite position. The user alternately activates actuators 26 and 70, respectively, by alternately pumping actuator arms 630 to alternately move the torso assembly with respect to the footing assembly back and forth (and even rapidly) between the first position and the second opposite position.

Additionally, actuators 26 and 70 can each be elongated, as seen in FIG. 20, to provide easier access by extending the reach of the user or the controller actuator arms 630 into contact with the actuators through the elevational outer openings 34 and 84. The elongated actuators 26 and 70 are employed with many of the alternative controller embodiments 610 that manually drive actuators 26 and 70 through the elevational outer openings 34 and 84. For example, the third alternative manual controller seen and described in FIG. 21, activating actuators 26 and 70 with the user's fingers, and the first and second alternative manual controllers seen and described in FIGS. 18A and 19A-B, activating actuators 26 and 70 by employing actuator arms 630, all benefit from elongated actuators 26 and 70 which make contact between the user's fingers or actuator arms and the actuators 26 and 70, easier and more secure so as not to slip off the actuators.

The third alternative controller 610, as seen in FIG. 21, provides a controller for supporting the toy FIG. 10, as described above, and manually driving movement of the toy FIG. 10 with the user's fingers. The toy FIG. 10 is held secure to the platform assembly 618 by employing the binding assembly, as discussed above, with the tension clip 620 and stationary clip 632 coupling the binding tabs 111 of the footing assembly 14 to the plate 616. Also included are the one or more protrusions 617 at the platform assembly for further stabilizing the footing assembly at the platform assembly during movement of torso assembly with respect to the footing assembly.

In use, the footing assembly 14 is coupled to the platform assembly 618 with the elevational outer openings 34 and 84 of the received footing assembly 14 accessible to the user's fingers as the user grips the handle 612 of the controller. An angled finger pad 610a is disposed adjacent the platform assembly for providing a support pad for holding the user's fingers or thumbs steady as they rest on the finger pad 610a while operating one or more of the actuators 26 and 70 of the received footing assembly. One or more ribs or ridges 636 are affix to a surface of the finger pad 610*a* providing support and grip to the user as their fingers and/or thumbs resting on the finger pad 610*a* while operating one or more of the actuators 26 and 70.

In the present third alternative controller embodiment, as seen in FIG. 21, the actuators 26 and 70 are elongated extending the reach of the user's fingers to easily, securely and comfortably drive actuators 26 and 70 of the received footing assembly 14 through elevational openings 34 and 84. The user's fingers and/or thumbs, while supported on the finger pad 630*a*, contact and depress the first working surface 60 of actuator 26 to move the torso assembly 12 with relation to the footing assembly toward the first position, and then alternately, the user contacts and depresses the first working surface 72 of the second actuator 70 to move the torso assembly 12 with relation to the footing assembly toward a second opposite position. The user alternately pumps actuators 26 and 70, respectively, to alternately move the torso assembly with respect to the footing assembly back and forth in a quick punching and fast fighting action movement of the toy FIG. 10.

From the foregoing, it can be seen that there has been provided a footing assembly in combination with a dual action actuator employing a working surface accessible through one or more actuator access openings of the footing assembly for driving an action movement of the toy figure by both a user's fingers and a variety of controllers secured to the footing. Also provided is a dual action actuator having two working surfaces accessible through two different openings in a toy figure's footing assembly for driving action movement of the figure's torso assembly relative to the footing assembly by both a user's fingers and a piston driven controller secured to the footing assembly. There has also been provided several alternative embodiment of the toy figure providing alternative appendage elements and their connection to the torso assembly through alternative mechanisms in mechanical communication with alternative footing gears and/or footing bracket or channel elements on which each appendage element is driven for movement in relation to the torso assembly as the torso assembly is moved in relation to the footing assembly. While a particular embodiment of the present invention has been shown and described, it will be obvious to those skilled in the art that changes and modifications may be made without departing form the invention in its broader aspects. Therefore, the aim in the appended claims is to cover all such changes and modifications as fall within the true spirit and scope to the invention. The matter set forth in the foregoing description and accompanying drawings is offered by way of illustration only and not as a limitation. The actual scope to the invention is intended to be defined on the following claims when viewed in their proper perspective based on the prior art.

What is claimed is:

1. A toy figure assembly, comprising:
a footing assembly having an actuator access opening;
a torso assembly in mechanical communication with the footing assembly allowing movement of the torso assembly in relation to the footing assembly;
an arcuate rack gear having at least a semi-circular periphery comprising gear teeth arranged from a first end to a second end of the semi-circular periphery of the arcuate rack gear;
a linkage extending between the torso assembly at the first end of the semi-circular periphery of the arcuate rack gear and a distal end of the linkage extending into the footing assembly;
a torso pinion gear within the torso assembly in mechanical communication with the arcuate rack gear for driving the movement of the torso assembly in relation to the footing assembly;
an actuator within the footing assembly coupled through the distal end of the linkage, the actuator having a working surface accessible from the actuator access opening for actuating the gear assembly and driving movement of the torso assembly in relation to the footing assembly.

2. The toy according to claim 1, further comprising a second linkage extending from the second end of the semi-circular periphery of the arcuate rack with a distal end of the second linkage extending into the footing assembly, and a second actuator coupled to the arcuate rack through a distal end of the second linkage, the second actuator positioned within the footing assembly and further including a working surface accessible from the actuator access opening, the second actuator cooperating with the first actuator to activate the arcuate rack and pinion gears driving movement of the torso assembly in relation to the footing assembly.

3. The toy according to claim 2, wherein the actuator access opening of the footing assembly further comprises an elevational outer opening and the working surface is accessible from the elevational outer opening.

4. The toy according to claim 2, further comprising a second working surface at the actuator and the actuator access opening further comprises an underside opening with the second working surface accessible from the underside opening.

5. The toy according to claim 1, further comprising an arm appendage and a shoulder pin in the torso assembly for coupling the arm appendage to freely move about the shoulder pin swinging the arm appendage out away from the torso assembly when the torso assembly moves in relation to the footing assembly.

6. The toy according to claim 5, further comprising a rack gear positioned within the torso assembly having an abutment surface for engaging the arm appendage and driving the arm appendage to swing to an elevated position from the torso assembly when the torso assembly is moved in relation to the footing assembly.

7. The toy according to claim 6, wherein the rack gear comprises a row of gear teeth, and further comprising a footing pinion gear linked with the footing assembly and positioned within the torso assembly having gear teeth that mesh with the gear teeth of the rack for driving the rack gear back and forth laterally across the torso assembly contacting the arm appendage with the abutment surface of the rack.

8. The toy according to claim 1, further comprising an arm appendage and a pinion gear mechanism in the torso assembly in mechanical engagement with the arm appendage, and further comprising a footing pinion gear linked with the footing assembly and positioned within the torso assembly having gear teeth that mesh with the pinion gear mechanism for driving movement of the arm appendage when the torso assembly moves in relation to the footing assembly.

9. A toy figure assembly, comprising:
footing assembly having an elevational outer opening and an underside opening;
a torso assembly in mechanical communication with the footing assembly allowing movement of the torso assembly in relation to the footing assembly;
a first axle;
an arcuate rack gear mounted on the first axle and having at least a semi-circular periphery comprising gear teeth arranged from a first end to a second end of the semi-circular periphery of the arcuate rack gear;

a second axle;

a torso pinion gear mounted on the second axle disposed within and connected to the torso assembly, the torso pinion gear is driven by the arcuate rack gear;

a linkage extending between the torso assembly coupled to a first end of the semi-circular periphery of the arcuate rack gear and a distal end of the linkage extending into the footing assembly;

an actuator within the footing assembly and coupled to the distal end of the linkage, the actuator including a first working surface accessible from the elevational outer opening of the footing assembly and a second working surface accessible from the underside opening of the footing assembly for actuating the gear assembly and driving movement of the torso assembly in relation to the footing assembly.

10. The toy according to claim 9, further comprising a second linkage extending from the second end of the semi-circular periphery of the arcuate rack with a distal end of the second linkage extending into the footing assembly and a second actuator coupled to the arcuate rack through a distal end of the second linkage, the second actuator positioned within the footing assembly and further including a first working surface accessible from the elevational outer opening and a second working surface accessible from the underside opening, the second actuator cooperating with the first actuator to activate the arcuate rack and pinion gears driving movement of the torso assembly in relation to the footing assembly.

11. The toy according to claim 10, further comprising an arm appendage and a shoulder pin in the torso assembly for coupling the arm appendage to freely move about the shoulder pin swinging the arm appendage out away from the torso assembly when the torso assembly moves in relation to the footing assembly.

12. The toy according to claim 10, further comprising a rack gear positioned within the torso assembly having an abutment surface for engaging the arm appendage and driving the arm appendage to swing to an elevated position from the torso assembly when the torso assembly is moved in relation to the footing assembly.

13. A toy figure assembly, comprising:

a footing assembly having an elevational outer opening;

a torso assembly in mechanical communication with the footing assembly allowing movement of the torso assembly in relation to the footing assembly;

an arcuate rack gear mounted on an axle with arcuate rack gear having at least a semi-circular periphery comprising gear teeth arranged from a first end to a second end of the semi-circular periphery of the arcuate rack gear;

a torso gear disposed within the torso assembly, the torso gear being driven by the arcuate rack gear;

an actuator within the footing assembly accessible from the elevational outer opening of the footing assembly configured to actuate the torso gear through the arcuate rack gear for movement of torso assembly relative to the footing assembly;

an arm having at least one appendage thereto extending from a shoulder portion;

a shoulder pin at the torso assembly for coupling the arm at the shoulder portion to move about the shoulder pin relative to the torso assembly and the footing assembly; and a link through the torso assembly coupling to the at least one appendage.

14. The toy according to claim 13, further comprising a second actuator positioned within the footing assembly and further including a working surface accessible from the elevational outer opening, the second actuator cooperating with the first actuator to activate the arcuate rack gear driving movement of the torso assembly in relation to the footing assembly.

15. The toy according to claim 14, further comprising an abutment surface for engaging the arm appendage and driving the arm appendage to swing to an elevated position from the torso assembly when the torso assembly is moved in relation to the footing assembly.

16. The toy according to claim 14, wherein the link coupling to the at least one appendage comprises at least one wire link.

17. The toy according to claim 16, further comprising a second wire link coupling to a second appendage of said arm.

18. The toy according to claim 16, further comprising a second arm and a second wire link coupling to the second arm.

19. The toy according to claim 16, wherein said arm comprises a second appendage thereto and further comprising a second wire link coupling to the second appendage.

20. The toy according to claim 19, wherein the second wire link moves the second appendage when the torso assembly is moved in relation to the footing assembly.

* * * * *